United States Patent [19]
Graf et al.

[11] Patent Number: 5,854,460
[45] Date of Patent: Dec. 29, 1998

[54] LINEAR MOTOR DRIVEN LASER CUTTING MACHINE

[75] Inventors: Raymond J. Graf, Cincinnati, Ohio; Dale C. Smyth, Jr., Lawrenceburg, Ind.; Jeffrey D. Wintring, Florence, Ky.; Robert C. Hertlein, Cincinnati, Ohio; Randall P. Coons, Crescent Springs, Ky.; Jeff J. Mills, Cincinnati, Ohio; Michael A. Halley, Westminster, Colo.; Jeffrey E. Farmer, Cincinnati, Ohio

[73] Assignee: Cincinnati Incorporated, Cincinnati, Ohio

[21] Appl. No.: 643,725

[22] Filed: May 7, 1996

[51] Int. Cl.$^6$ .................................................. B23K 26/00
[52] U.S. Cl. .............................. 219/121.67; 219/121.78; 428/116
[58] Field of Search ................... 219/121.67, 121.82, 219/121.84, 121.78, 121.8, 121.6; 428/116, 117

[56] References Cited

U.S. PATENT DOCUMENTS

| | | |
|---|---|---|
| 4,524,582 | 6/1985 | Lucas et al. |
| 5,049,723 | 9/1991 | Macdonald .......................... 219/121.78 |
| 5,231,264 | 7/1993 | Fujita .................................. 219/121.78 |
| 5,304,773 | 4/1994 | Kilian et al. ........................ 219/121.78 |
| 5,480,729 | 1/1996 | Hattori et al. ........................... 428/593 |
| 5,481,083 | 1/1996 | Smyth, Jr. ........................... 219/121.82 |
| 5,662,568 | 9/1997 | Lindem ..................................... 483/30 |

FOREIGN PATENT DOCUMENTS 2688971  9/1993  France .

OTHER PUBLICATIONS

*Industrial Laser Review*, Sep.,1993 Issue—"Boeing Laser Scribing System".
*Industrial Laser Review*, Dec.,1993 Issue—"Letter to the Editor from Dr. Lutz Langhans of Baasel Lasertech".
"Gantry 5000 High Speed/High Performance Motion Systems", Anorad Corporation, Aug. 1991.
"5900 Series Precision Gantries for Laser Cutting/Scribing", Anorad Corporation, No Date.
"Gantry 5000 High Speed/High Performance Motion Systems", Brochure—Anorad Corporation, No Date.
"Cincinnati CL-707 Laser System", Brochure—Cincinnati, Inc., 1996.
German document describing a liner motor laser system, No Date.

*Primary Examiner*—Geoffrey S. Evans
*Attorney, Agent, or Firm*—Frost & Jacobs LLP

[57] ABSTRACT

A gantry assembly and appurtenances therefor for a linear motor driven laser cutting machine. The gantry box is made of honey comb construction characterized by high strength, light weigh, high stiffness to weight ratio and vibration absorption. The gantry box is supported at each of its ends on a linear motor driven carriage by a torsion plate. The torsion plates are exteriorly flanked by protective panels which support a light weight cover for the upper part of the gantry assembly. The beam end of the gantry box is additionally attached to its gantry carriage by a snubber pin-snubber bushing assembly and by a gantry pin-carriage pin-link assembly. These last two assemblies, together with the torsion plates and gantry carriages, limit or restrain certain movements of the gantry box. The laser cutting machine is controlled by a high performance multi-axis motion controller. Each gantry carriage is provided with a wiper-seal assembly and bellows mounting assembly at each of its ends to prevent accumulation of foreign material between each gantry mounted linear motor and its respective magnet track.

27 Claims, 16 Drawing Sheets

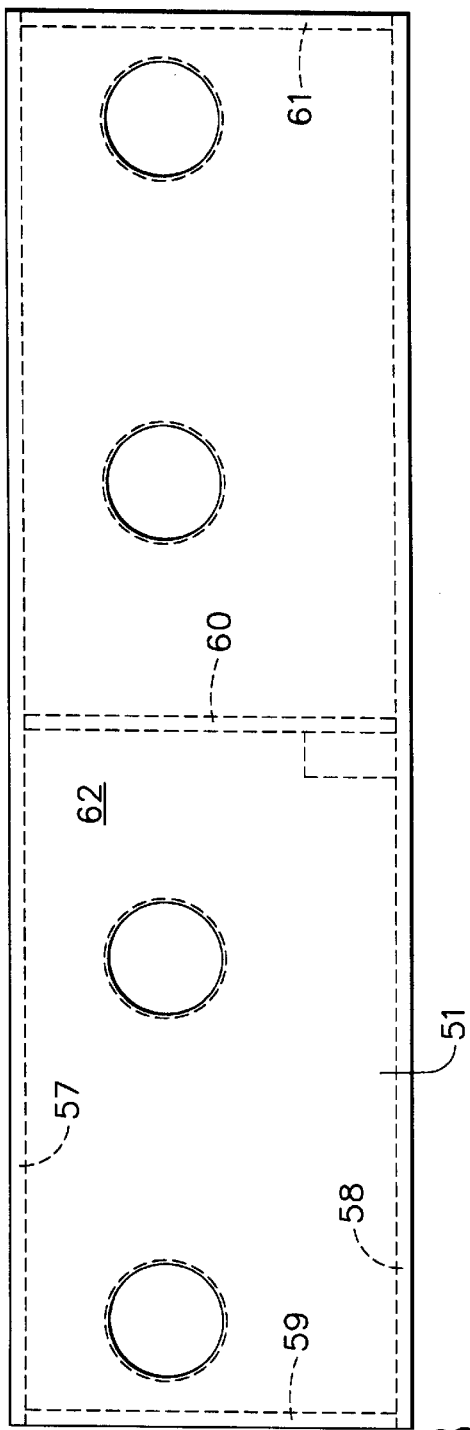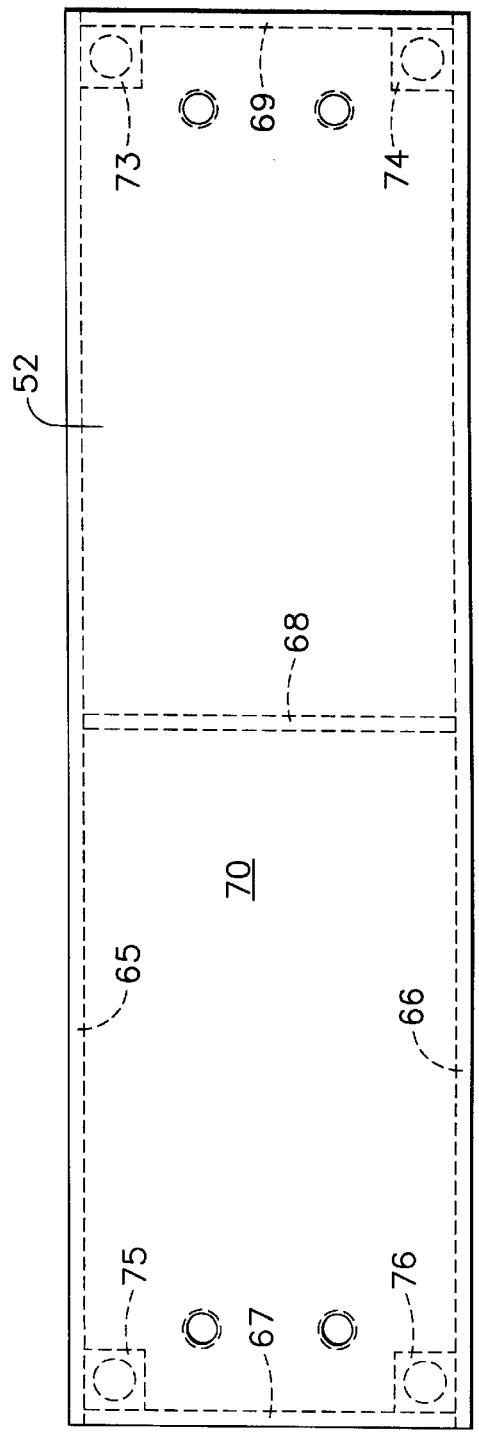
FIG. 8
FIG. 9

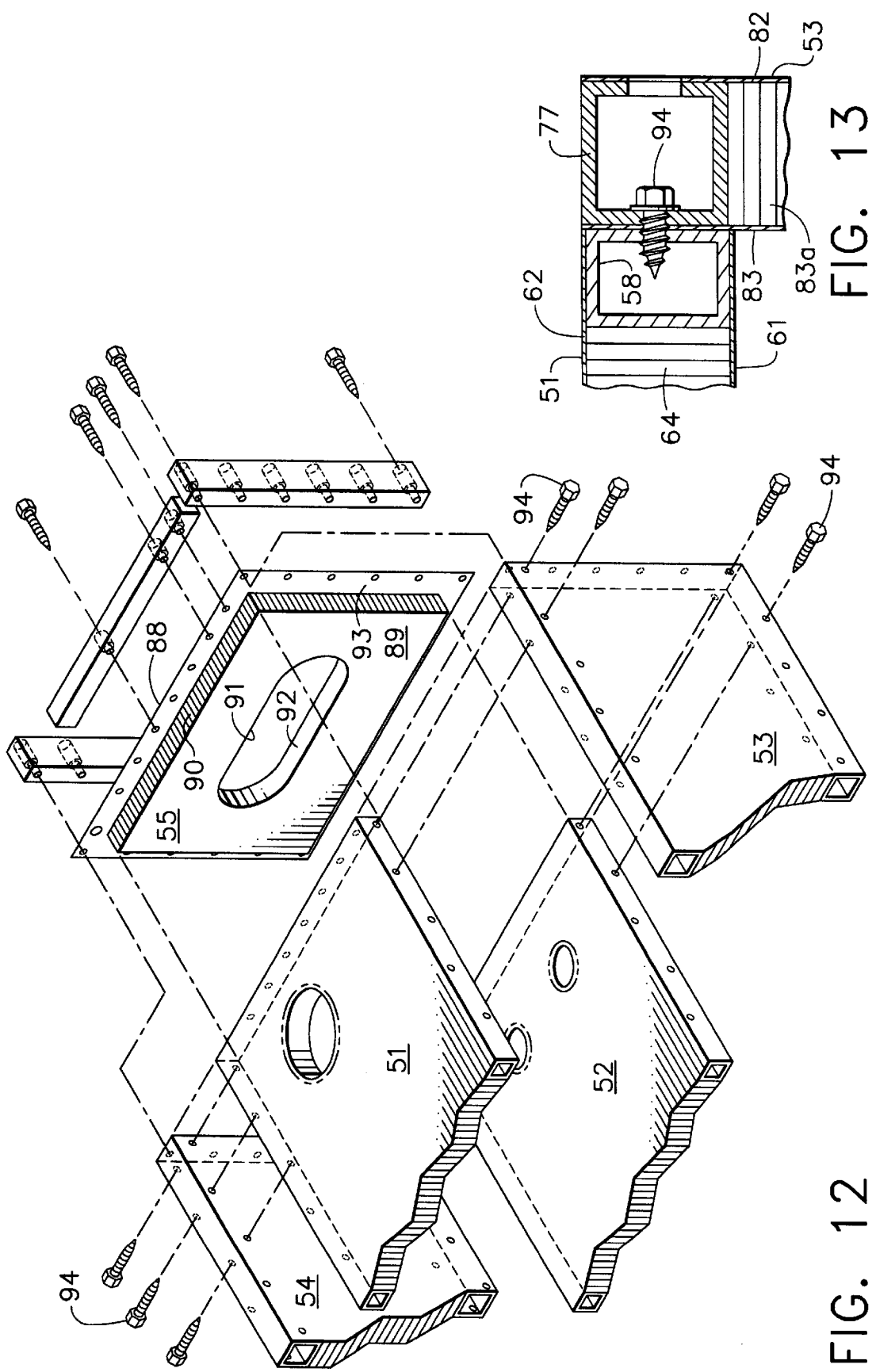

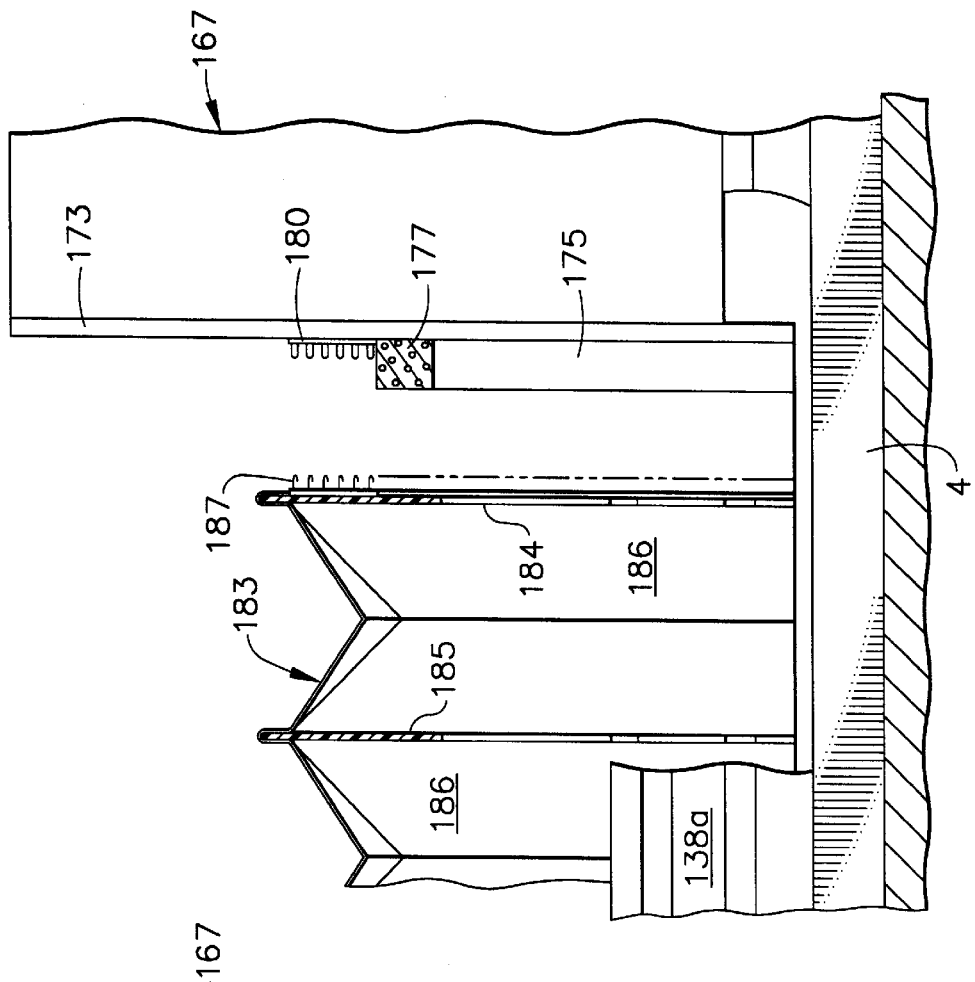
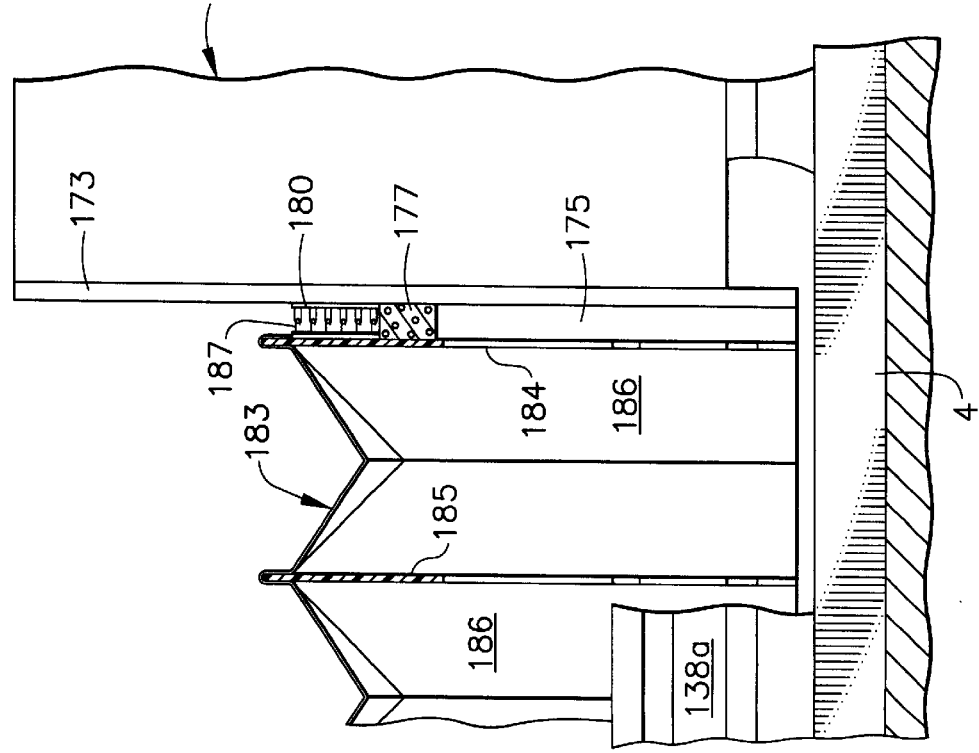

LINEAR MOTOR DRIVEN LASER CUTTING MACHINE

TECHNICAL FIELD

The invention relates to a linear motor driven laser cutting machine, and more particularly to such a machine having a linear motor driven gantry assembly of improved construction and having improved appurtenances.

BACKGROUND ART

Laser cutting machines of the type to which the present invention is directed are well known in the art. In their most usual form, they comprise an elongated main frame having upstanding front or operator-side and rear or beam-side portions in substantially parallel spaced relationship with a cutting zone and a loading/unloading zone located therebetween. The parallel, upstanding, main frame portions are generally described as extending in the directions of the X-axis, while the Y-axis extends transversely of these main frame portions and the Z-axis is vertically oriented. The machine is provided with a gantry, the ends of which are mounted on the upstanding frame members for movement therealong in the X-axis directions. The gantry carries a carriage mounted laser cutting head capable of traversing along the gantry in the Y-axis direction. Movement of the gantry in the X-axis directions and movement of the laser head carriage in the Y-axis directions assure that the laser cutting head can be located anywhere in the cutting zone of the machine.

Movement of the gantry along the upstanding main frame members and movement of the carriage along the gantry have heretofor usually been accomplished by rack and pinion assemblies, or ball screw assemblies. In a rack and pinion drive system, a rack and pinion assembly has been provided at each end of the gantry. This type of drive system, however, is relatively slow and is characterized by a poor acceleration rate. When a ball screw system was used to drive the gantry, a ball screw assembly was sometimes provided at both ends of the gantry. Frequently, however, a ball screw assembly was located at one end of the gantry and the other end of the gantry simply followed the first end and relied primarily on the heavy and stiff construction of the gantry and the gantry guiding means to maintain its proper position.

In recent years, there has been increasing interest in moving the gantry in the X-axis directions and the laser head carriage in the Y-axis directions by means of linear motors. Linear motors have many advantages over rack and pinion systems and ball screw systems. Linear motors are very low maintenance because they have no contacting parts. They reduce friction load and help to improve accuracy. A linear motor is capable of far higher rapid traverse speed (i.e. 6,000 ipm as compared with 1,000 to 3,000 ipm for prior art systems). Linear motors provide a stiffer drive, eliminating axial and torsional deflection characteristic of ball screws and torsional deflections of cross shafts on rack and pinion systems. Linear motor systems are direct drives. There are no deflection members between the drive and the driven members. Position accuracies approach the resolution of the linear encoders used. The drive force and position sensing are near the load. The use of linear motors provides higher cutting speed for the same accuracy, or greater accuracy for the same cutting speed. Finally, linear motors are quieter.

DISCLOSURE OF THE INVENTION

According to the invention there is provided an improved gantry assembly and its appurtenances for use with a linear motor driven laser cutter. The primary part of the gantry is a gantry box of honeycomb construction which demonstrates remarkable strength while being very light in weight, having a high stiffness to weight ratio. The honeycomb structure quickly absorbs vibration from the CNC drives and other sources. It also prevents vibration resonance or amplification.

The gantry box is connected to linear motor driven carriages by torsion plates, one at each end of the gantry box. Each torsion plate is provided with a protective end panel. The protective end panels also support a lightweight cover for the upper portion of the gantry assembly. The beam end of the gantry box is additionally physically attached to its respective carriage by a snubber pin and snubber bushing assembly and by a gantry pin and a carriage pin joined together by a link. These elements control or constrain certain movements of the gantry box, as will be described hereinafter.

The laser cutter machine is controlled by a high performance multi-axis motion controller capable of interfacing with the linear motors. Finally, the carriages, themselves, are provided with scrape and seal assemblies and bellows seal assemblies to prevent accumulation of foreign material between the linear motors and their respective magnet tracks. A linear encoder is provided for each linear motor producing position feedback for the high performance multi-axis motion controller.

BRIEF DESCRIPTION OF THE DRAWINGS

FIG. 8 is a simplified top plan view of the top panel of the gantry box.

FIG. 9 is a simplified bottom plan view of the bottom panel of the gantry box.

FIG. 12 is a simplified, exploded, perspective view illustrating the manner of assembly of the gantry box.

FIG. 13 is a fragmentary cross-sectional view illustrating the assembly of the front panel to the top panel.

FIG. 20 is a fragmentary side elevational view, partly in cross-section, illustrating one of gantry running bellows affixed and sealed to the bellows mounting plate.

FIG. 21 is a fragmentary side elevational view, partly in cross-section, illustrating the gantry running bellows of FIG. 20 separated from the bellows mounting plate.

DETAILED DESCRIPTION OF THE INVENTION

Figure 1:
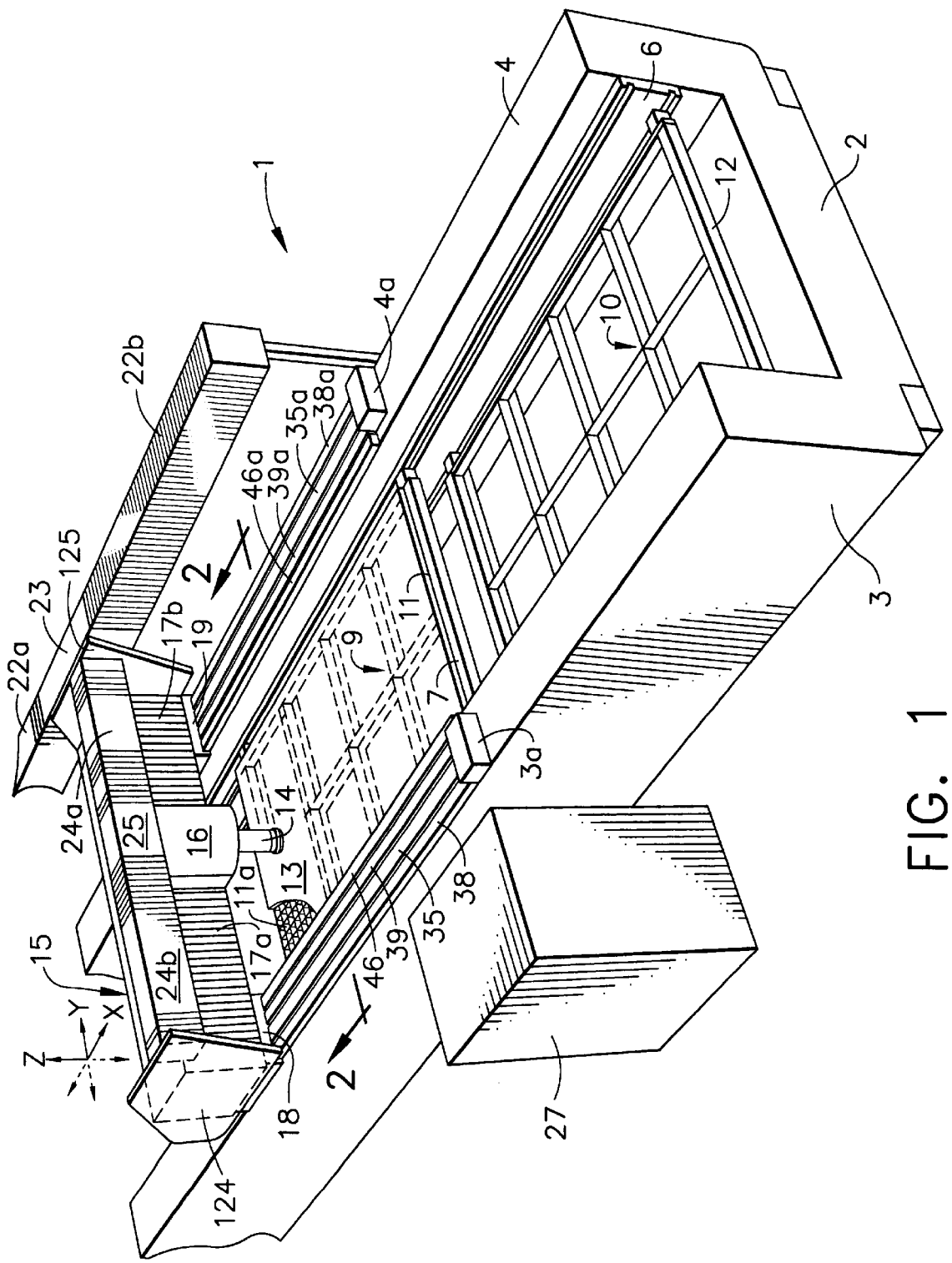
FIG. 1 is a perspective view of the linear motor driven laser cutting machine of the present invention.

Throughout the specification, like parts have been given like index numerals. Reference is first made to FIGS. 1, 2, 3 and 4. The laser cutting machine of the present invention is generally indicated at 1. The laser cutting machine 1 has a main frame 2 with an upstanding front or operator's-side main frame portion 3 and a rear or beam side upstanding main frame portion 4. The main frame portions 3 and 4 support rail assemblies 5 and 6, respectively (See FIG. 2). The rail assemblies 5 and 6, in turn, support upper and lower work piece pallets 7 and 8. The upper and lower workpiece pallets 7 and 8 are shiftable along rails 5 and 6 between a cutting zone generally indicated at 9 and a loading and unloading zone, generally indicated at 10 (see FIG. 1).

The pallets 7 and 8 may be substantially identical. It will be noted from FIG. 1 that the upper pallet 7 comprises a rectangular framework 11 made up of longitudinal and transverse frame members. In each open square defined by the longitudinal and transverse members of frame 11 there is supported a metallic grating which may have an "egg-crate" design. One such grating is shown in FIG. 1 at 11a. The gratings 11a support the workpiece which is fragmentarily shown at 13. It will be understood that the pallet 8 may have a framework 12 substantially identical to the framework 11 and provided with gratings (not shown) similar to grating 11a.

The laser cutting machine 1 is provided with a laser cutting head 14. In order to make appropriate cuts on workpiece 13, it is necessary that the laser cutting head 14 be movable anywhere within cutting zone 9. To this end, the laser head is mounted on a gantry assembly generally indicated at 15. As is well known, the gantry 15 is traversable longitudinally of the laser cutting machine 1 in the directions of the X-axis (see FIGS. 1 and 3 ). In addition, the laser cutting head 14 is traversable along the gantry assembly 15 transversely of the laser cutting machine 1 in the directions of the Y-axis. Further, as is well known in the art, the laser cutting head is shiftable vertically in the directions of the Z-axis by any appropriate means such as a linear motor, ball screw, rack and pinion, fluid cylinder, or the like, to enable the laser cutting head 14 to be properly located with respect to a workpiece mounted on either upper pallet 7 or lower pallet 8.

The laser cutting head 14 is mounted on a carriage 16 which is shiftable in the directions of the Y-axis along the gantry assembly 15. The gantry assembly 15 is provided with a gantry bellows made up of two segments 17a and 17b . The gantry bellows 17a–17b protect the mechanism supporting and driving the laser cutting head carriage 16, as will be apparent hereinafter.

The gantry assembly 15 is mounted on a pair of gantry carriages 18 and 19. The carriages 18 and 19 are independently driven in the directions of the X-axis, each by its own linear motor 20 and 21, respectively (see FIG. 3). The carriage assemblies 18 and 19 for the gantry assembly 15 will be described in greater detail hereinafter.

The laser beam generator (not shown) is, in most instances, remote from gantry assembly 15. The beam generated by the laser beam generator is directed through an X-axis laser beam delivery bellows made up of a first part 22a through which the beam passes and a second part 22b (see FIG. 1). The X-axis laser beam delivery bellows parts 22a and 22b are affixed to a junction member 23. The junction member 23 is operatively connected to the gantry assembly 15 and travels therewith. The junction member 23 contains a mirror (not shown) which changes the direction of the laser beam 90 degrees and directs it into the Y-axis laser beam delivery bellows made up of two parts 24a and 24b, the laser beam passing through bellows part 24a. The facing ends of Y-axis bellows parts 24a and 24b are affixed to a junction member 25 containing a mirror (not shown) which directs the laser beam vertically downwardly through the laser cutting head 14. The necessary electrical cables for the liner motors 20 and 21 of the gantry assembly and the linear motor of the laser cutting head carriage 16 (to be described hereinafter) are housed in a flexible cable carrier 26 (see FIG. 2) so that the cables may shift with the gantry assembly. Finally, the laser cutting machine 1 is provided with a control console 27. (See FIG. 1). The laser cutting machine is controlled by a high performance multi-axis motion controller capable of interfacing with the linear motors.

Figure 5:
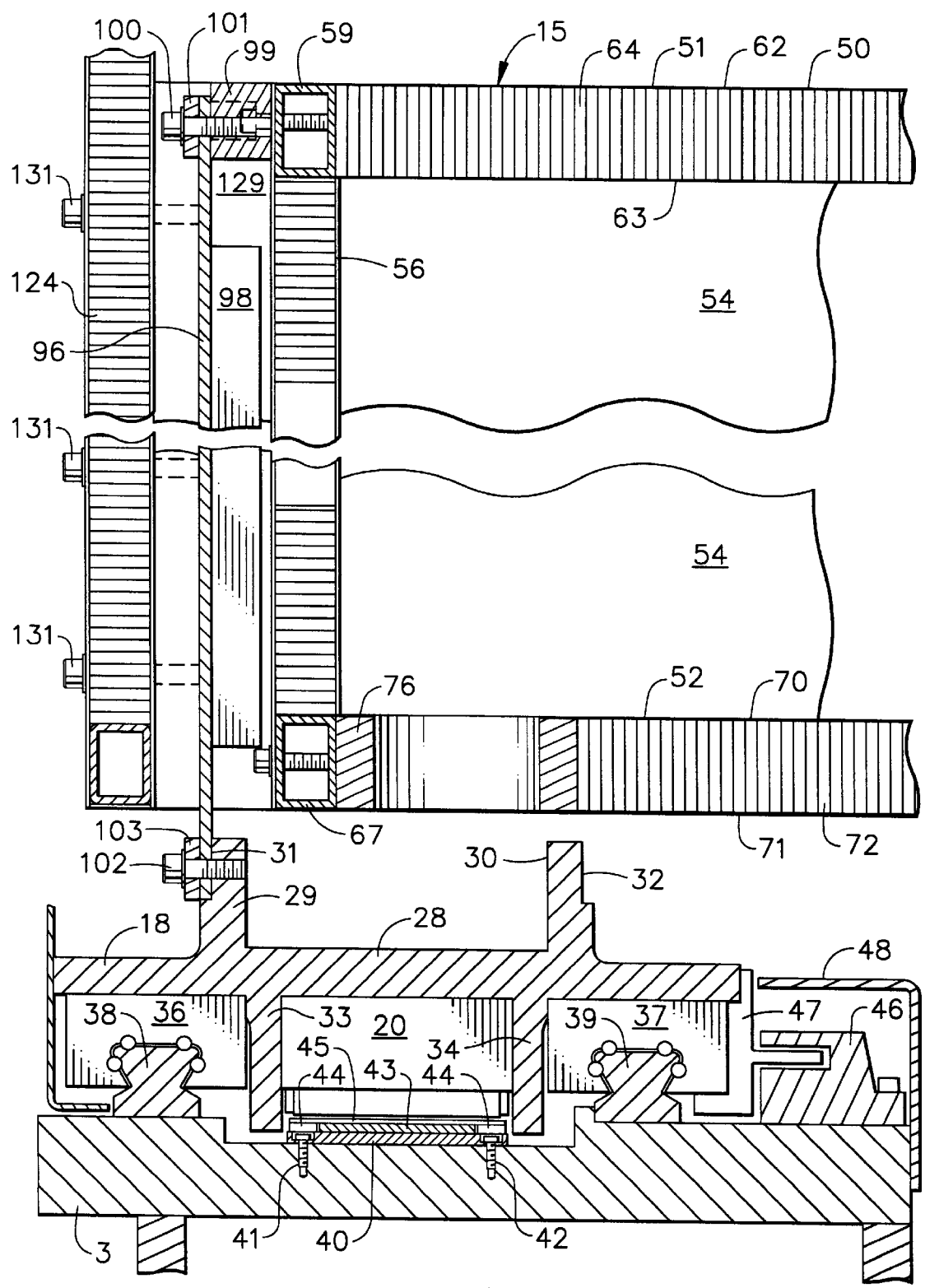
FIG. 5 is a fragmentary cross-sectional view taken along section line 5—5 of FIG. 4.

Reference is now made to FIG. 5 which, as is indicated above, is a fragmentary cross-sectional view through the front or operator's-side end of gantry assembly 15 and through carriage 18. Carriage 18 comprises an elongated plate-like body 28 having on its upper surface a pair of parallel, spaced, longitudinally extending, upstanding ribs 29 and 30. The ribs 29 and 30 are each notched, as at 31 and 32, respectively. The purpose of ribs 29 and 30 and their notches 31 and 32 will be apparent hereinafter. The body portion 28 of carriage 18 has a pair of ribs 33 and 34 extending downwardly from its bottom surface. The ribs 33 and 34 extend longitudinally of carriage 18 in parallel spaced relationship.

Between the lower ribs 33 and 34 there is mounted to carriage 18 a linear motor 20. There are various types of linear motors. In an exemplary embodiment of the present invention excellent results were achieved with a permanent magnet AC brushless linear servo motor. To the left of rib 33 (as viewed in FIG. 5) the carriage 18 has affixed thereto a set 36 of three linear bearings arranged in a tandem row. In FIG. 5 only one bearing of the set is shown, the other bearings of the set being therebehind. To the right of rib 34 (as viewed in FIG. 5) the carriage 18 has affixed thereto a set 37 of three preloaded linear bearings arranged in a tandem row. In FIG. 5 only the front one of the three linear bearings of the set is shown.

The carriage 18, and the gantry assembly 15 mounted thereon, are intended to shift back and forth in the directions of the X-axis along main frame portion 3. To this end, the top surface of the front or operator's-side main frame portion 3 supports a pair of bearing rails 38 and 39 on which the carriage linear bearing sets 36 and 37 are mounted, respectively. The top surface of the front or operator's-side main frame portion 3 also supports, between bearing rails 38 and 39, a magnet rail 40, constituting a part of linear motor 20, and being affixed to the top surface of main frame portion 3 by machine screws, two of which are shown at 41 and 42. A plurality of magnets are adhesively affixed to the upper surface of the magnet rail 40. One such magnet is shown at 43. The edges of the upper surface of the magnet rail are each surmounted by a strip of foam tape, such as neoprene foam tape, shown at 44, respectively. The tape strips 44 are adhesively coated on both sides and maintain a woven fiberglass protective layer 45, impregnated with Teflon™ over the top of magnet track 42. In this way the magnet track 42 is essentially sealed from dirt. Protective layer 45 also serves as a moisture barrier.

Along the inner edge of the top surface of the front or operator's side main frame portion 3 there is mounted a linear encoder 46 having substantially the same length as bearing rails 38 and 39. The movable element or read head 47 of the linear encoder is affixed to carriage 18, as shown. A protective shield 48 for the linear encoder is mounted on main frame portion 3.

Figure 6:
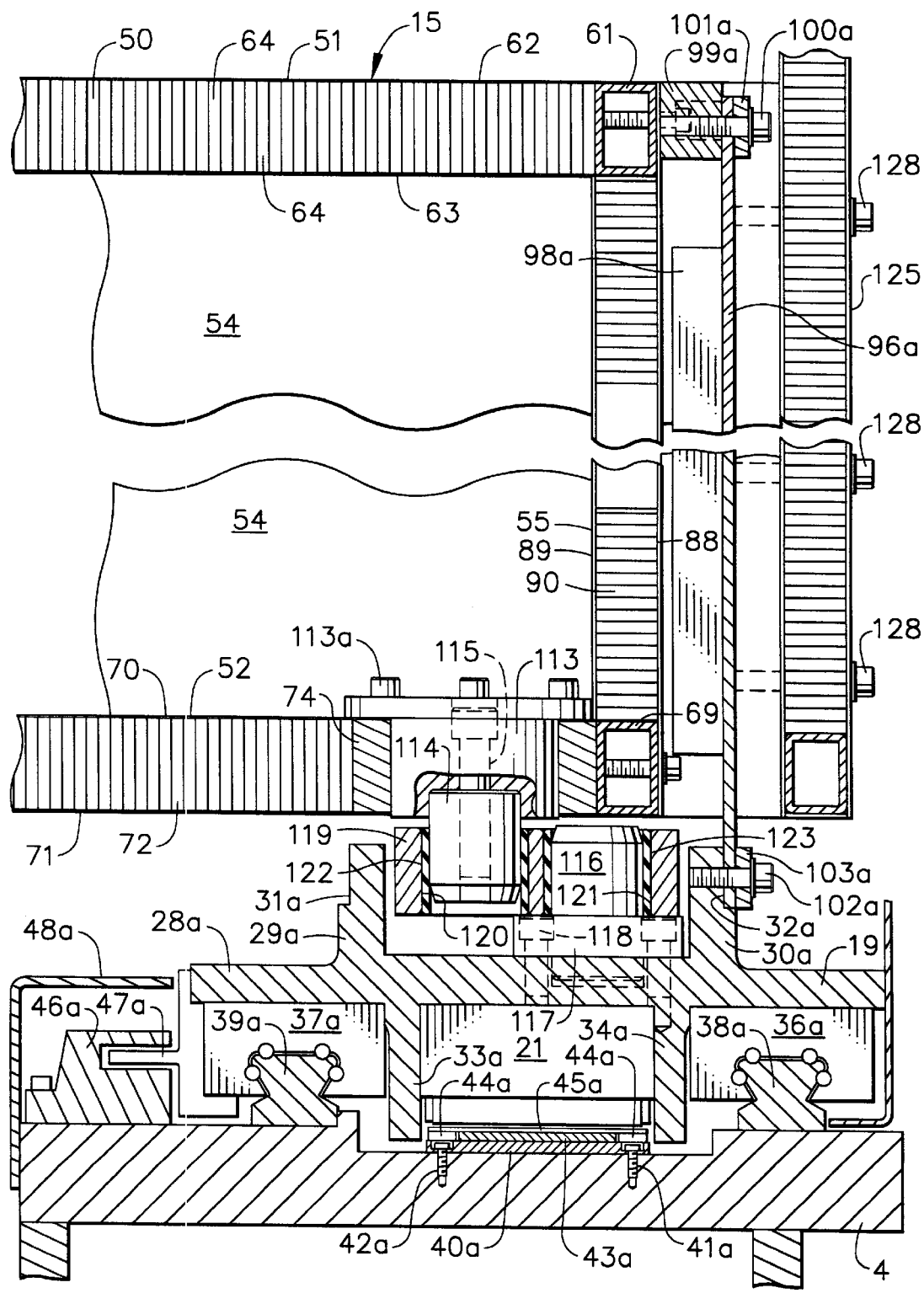
FIG. 6 is a fragmentary cross-sectional view taken along section line 6—6 of FIG. 4.
Figure 14:
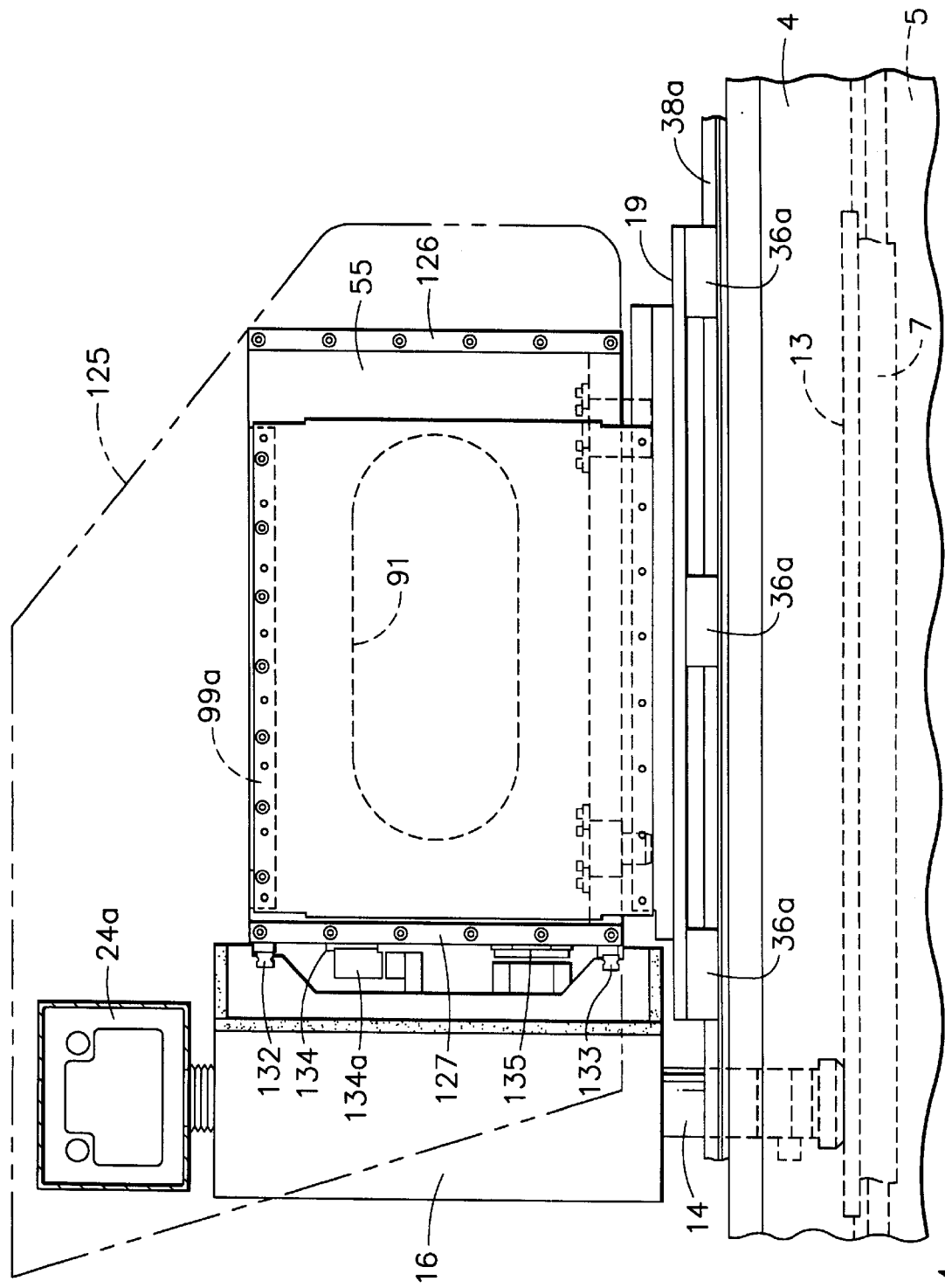
FIG. 14 is a fragmentary rear or beam-side elevational view of the gantry assembly of the present invention.

Reference is now made to FIG. 6. It will be noted that the arrangement for carriage 19 is a mirror image of the arrangement for carriage 18 shown in FIG. 5. Carriage 19 is, in fact, identical to and completely interchangeable with carriage 18. Carriage 19 and that end of gantry assembly 15 mounted thereon are intended to shift back and forth in the directions of the X-axis along the top surface of the rear or beam-side main frame portion 4. Since the overall carriage arrangement for carriage 19 is a mirror image of the carriage arrangement for carriage 18, like parts have been given like index numerals followed by "a". Thus, the carriage 19 has a main body portion 28a with a pair of upstanding, longitudinally extending ribs 29a and 30a provided with notches 31a and 32a, respectively. The body portion 28a of carriage 19 also carries a pair of downwardly depending, longitudinally extending, parallel spaced ribs 33a and 34a with the linear motor 21 mounted therebetween. Carriage 19 supports a pair of sets of three preloaded linear bearings 36a and 37a identical to the sets of bearings 36 and 37 of FIG. 5. It will be noted that all three of the bearings of set 36a are shown in FIG. 14. The upper surface of the rear or beam-side main frame portion 4 supports a pair of longitudinally extending rails 38a and 39a which cooperate with linear bearings 36a and 37a, respectively. The upper surface of the rear or beam side main frame portion 4 also has a magnet rail 40a screwed thereto. The magnet rail 40a is a part of linear motor 21 and has a plurality of magnets affixed thereto by adhesive. One magnet is shown in FIG. 6 at 43a. Double coated foam tape strips 44a, equivalent to tape strips 44, are shown, by which a protective cover strip 45a is mounted over the top of magnets 43a. The structure is completed by linear encoder 46a and its movable part or read head 47a, identical to linear encoder parts 46 and 47 of FIG. 5, together with protective shield 48a identical to protective shield 48 of FIG. 5. At both ends of rails 38, 39, 38a and 39a there is located a conventional bumper assembly. Two such assemblies are shown at 3a and 4a in FIG. 1.

The gantry assembly 15 comprises an elongated gantry box 50 which extends transversely of main frame 2. The gantry box 50 is best shown in FIGS. 3, 4, 5 and 6. The gantry box is made up of a top panel 51, a bottom panel 52, a first side panel 53, a second side panel 54, a rear or beam side end panel 55 and a front or operator's-side end panel 56.

Reference is now made to FIG. 8 wherein top panel 51 is shown. Top panel 51 comprises an elongated rectangular member and is made up of a framework of aluminum tubing members having a rectangular cross-section. There are two longitudinal frame members 57 and 58 and three transverse frame members 59, 60 and 61. The various frame members are welded together (or otherwise joined together, as by adhesive), and are covered both top and bottom with a thin top aluminum skin 62 and a thin bottom aluminum skin 63 (see FIG. 5). Within the framework and between the thin aluminum skins 62 and 63 there is an aluminum honeycomb structure 64 adding strength and rigidity. The top and bottom skins 62 and 63 are attached to the frame members and the honeycomb structure by appropriate adhesive means.

The bottom panel 52 is of similar construction comprising two longitudinal frame members 65 and 66 and three transverse frame members 67, 68 and 69. As is clearly shown in FIG. 5, the bottom panel 52 has a top skin 70 and a bottom skin 71 with a honeycomb structure 72 therebetween. Near its four corners, bottom panel 52 has hard points located therein, as at 73, 74, 75 and 76, the purpose of which will be apparent hereinafter.

Figure 3:
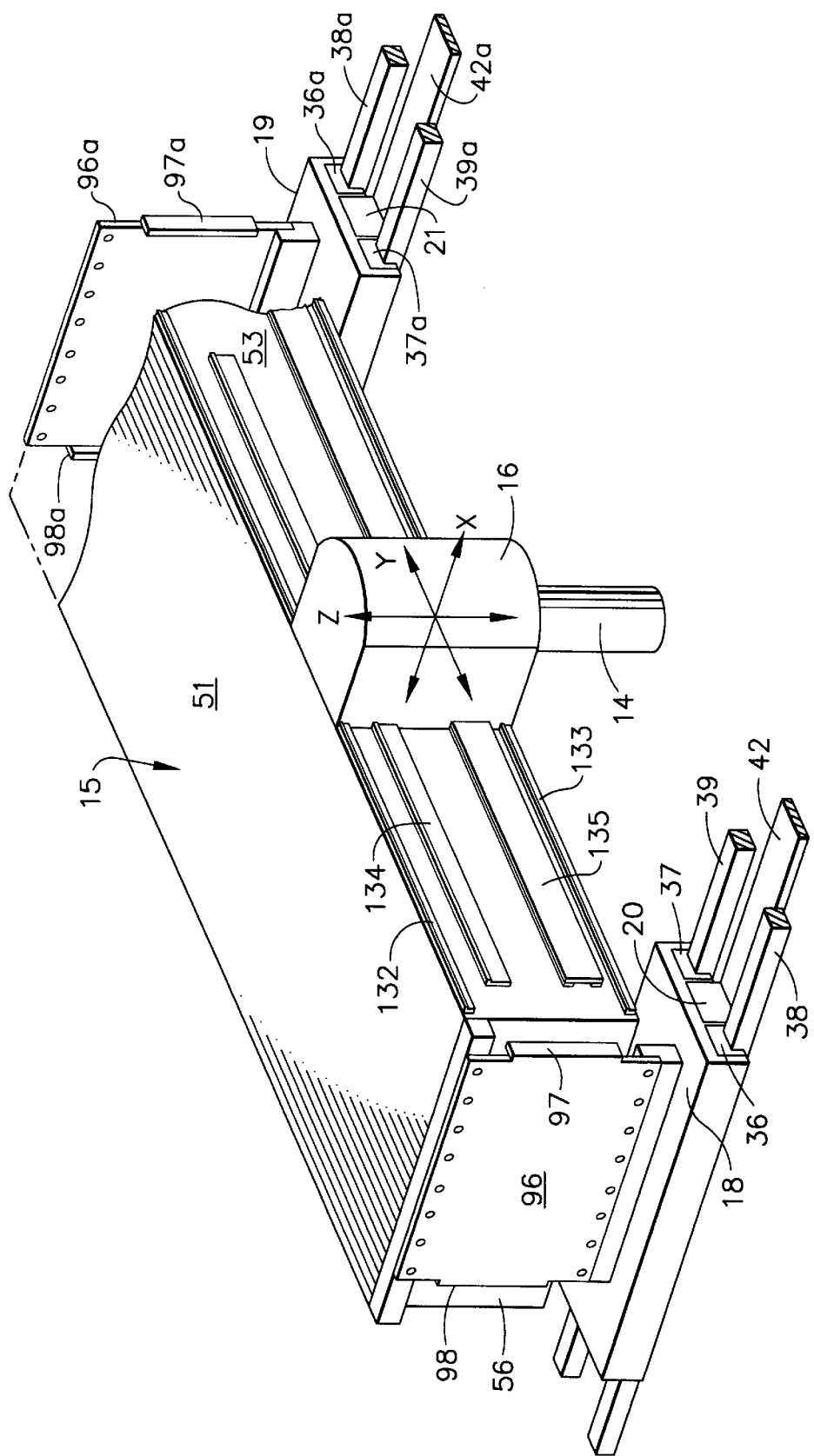
FIG. 3 is a fragmentary, schematic, perspective view of the linear motor driven gantry assembly, including the gantry box, the gantry carriages and the torsion plates therebetween.
Figure 4:
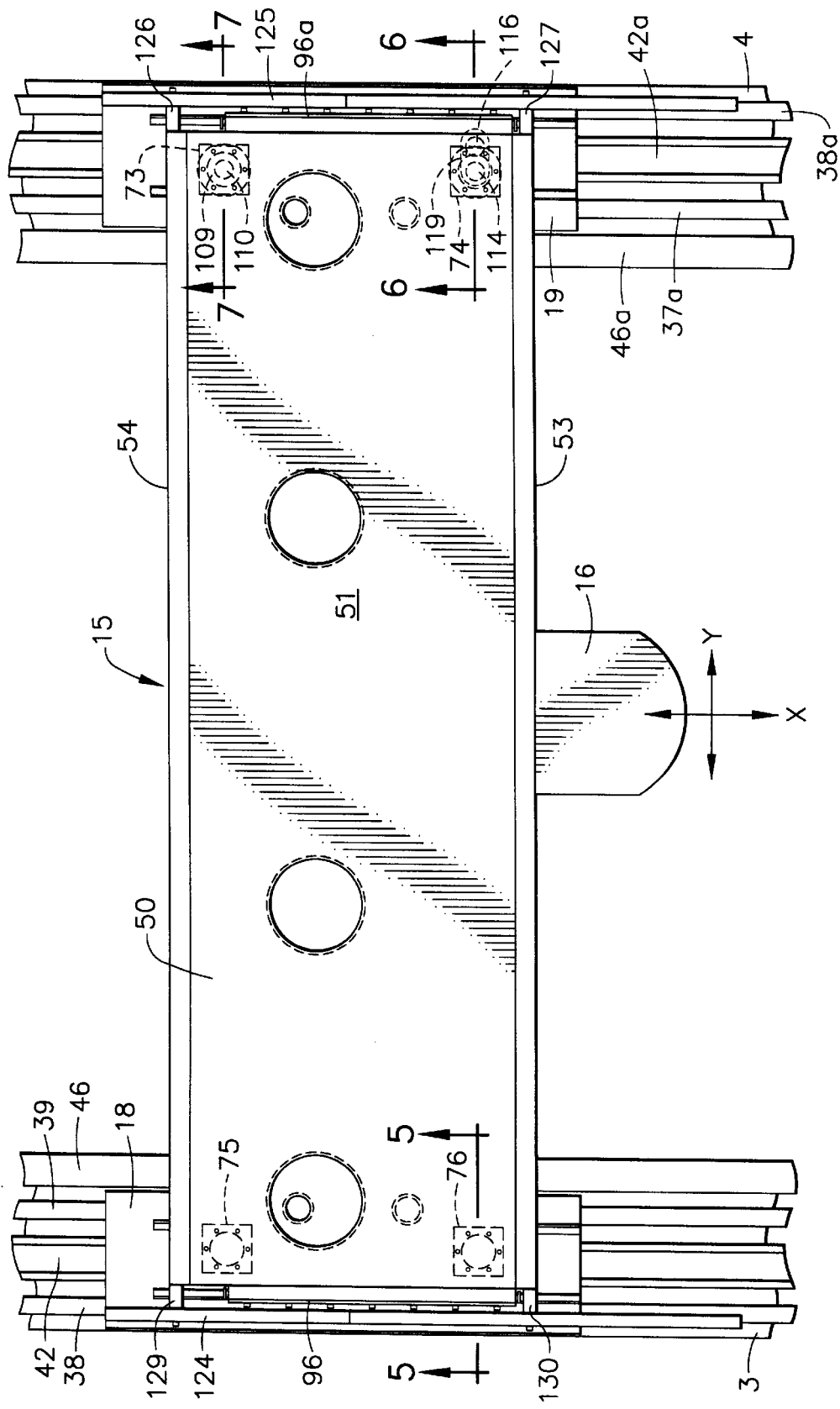
FIG. 4 is a top plan view of the gantry assembly.
Figure 10:
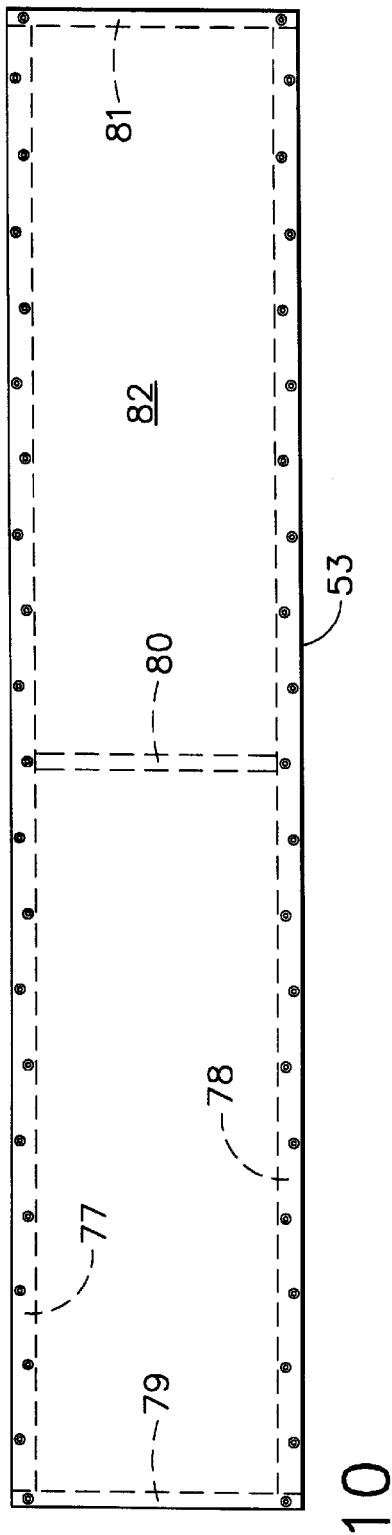
FIG. 10 is a simplified elevational view of a side panel of the gantry box.

FIG. 10 is an elevational view of the first side panel 53 shown in FIGS. 3 and 4. Side panel 53 is of the same construction as top panel 51 and bottom panel 52, having longitudinal frame members 77 and 78 with transverse frame members 79, 80 and 81 welded or adhered thereto. The side panel 53 is provided with an outer skin 82 (see FIG. 10) and an inner skin 83 (see FIG. 13). Between skins 82 and 83, and within the framework of the panel, panel 53 is provided with honeycomb structure 83a (see FIG. 13), as in the case of top panel 51 and bottom panel 52. It will be understood that the second side panel 54 will be of exactly the same construction as first side panel 53, with the exception that the panel 53 may be provided with a number of hard points (not shown), within the panel structure or on the outside surface of its inner skin, to assist in supporting the various elements mounted to first panel 53, which will be described hereinafter.

Figure 7:
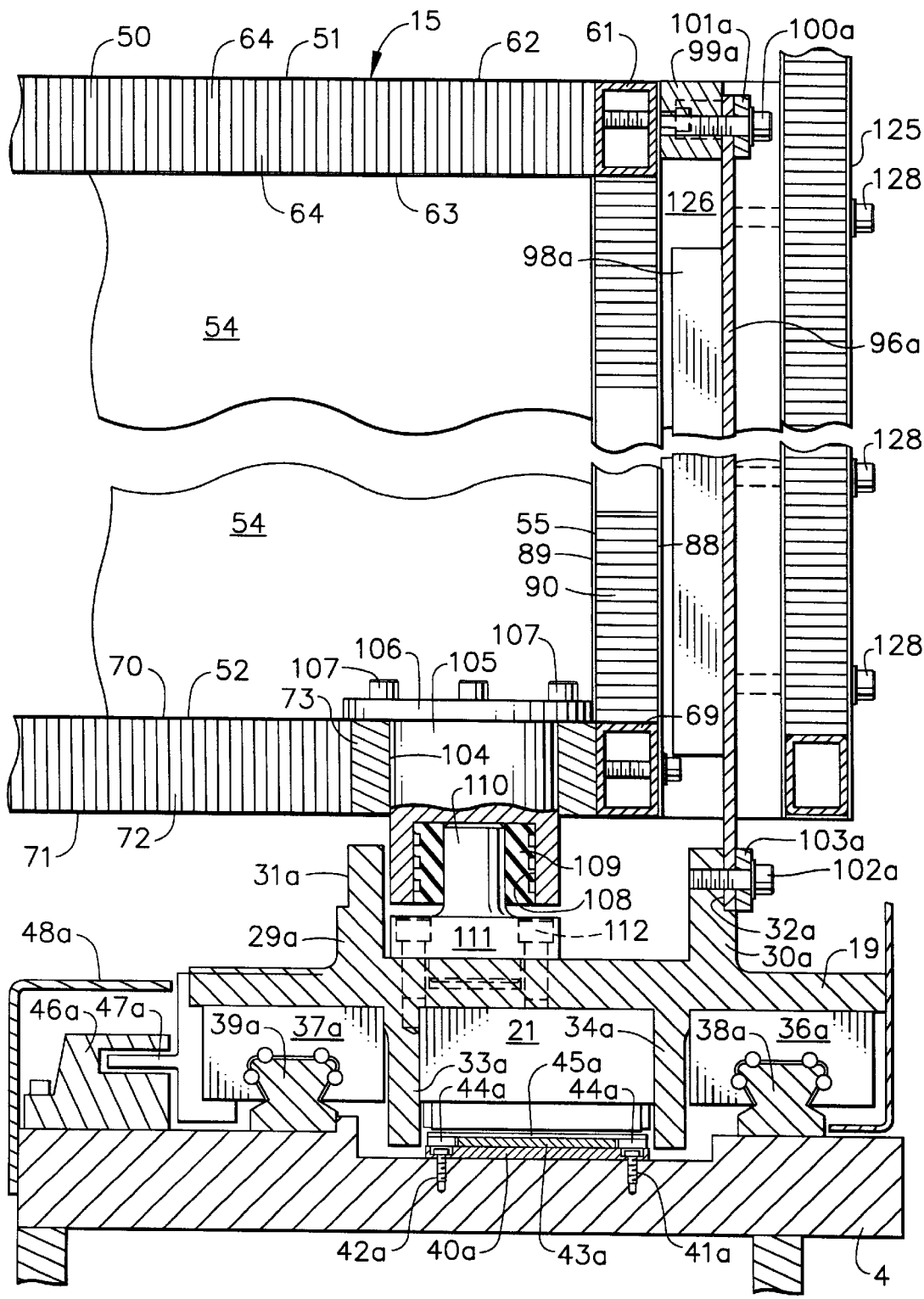
FIG. 7 is a fragmentary cross-sectional view taken along section line 7—7 of FIG. 4.
Figure 11:
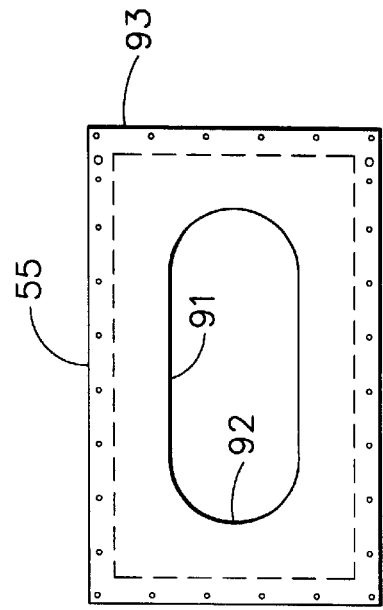
FIG. 11 is a simplified elevational view of the rear or beam-side end panel of the gantry box.

Finally, FIG. 11 illustrates the rear or beam side end panel 55, also shown in FIGS. 6, 7 and 12. The end panel 55 does not have frame members of rectangular cross-section as do the other panels of gantry box 50. End panel 55 comprises outer skin 88 and inner skin 89 with a honeycomb structure therebetween, shown at 90 in FIGS. 6 and 7. These elements are joined together with adhesive. As is clearly shown in FIGS. 11 and 12, and end panel 55 as an obround hole 91 formed therein provided with a ribbon-like aluminum lining 92. Finally, it will be noticed that the outer skin 88 extends beyond the honeycomb structure 90, forming a peripheral flange by which end panel 55 can be adhesively attached to top panel 51, bottom panel 52, and side panels 53 and 54 both adhesively and by screws. It will be understood that the front or operator's-side end panel 56 (see FIG. 5) will be of identical construction to that of end panel 55.

Reference is now made to FIGS. 12 and 13. As is clear from FIG. 12, the side panels 53 and 54 are abutted against the edges of top and bottom panels 51 and 52 and are affixed thereto by self-tapping screws 94. Excellent results have been achieved using hex head screws with integral washers. As an example, FIG. 13 shows the first side panel 53 attached to the top panel 51. Each screw 94 passes through the outer skin 82 and one side of the frame member 77 of the side panel 54. Thereafter it passes through the second side of the frame member 77 and the inner skin 83 of the side panel 53 into the adjacent frame member 58 of the top panel 51. Thus, the machine screw head enters the frame member 77 of the side panel 53 and abuts the opposite side of the frame member 77 as it enters the frame member 58 of the top panel 51 and tightens the side panel 53 thereagainst. The enlarged outer holes through the machine screw heads pass may be closed with plastic caps or the like (not shown), if desired. With respect to end panel 55, shown in FIG. 12, it will be noted that the panel will enter the end opening defined by the gantry box top 51, bottom 52 and side panels 53 and 54, and the panel 55 and its flange 93 will be adhesively secured directly to the ends of these frame members.

Reference is now made to FIGS. 3 and 5. The front or operator's-side end of gantry box 50 is attached to carriage 18 by a torsion plate 96. The torsion plate 96 is preferably made of aluminum having a thickness of about ⅛ inch, and has formed along its vertical sides in-turned stiffening flanges 97 and 98 to prevent the torsion plate from buckling. The upper edge of torsion plate 96 is affixed to a spacer bar 99 by a series of machine screws 100 which pass through a washer strip 101 and through the upper edge of torsion plate 96 and into the spacer bar 99. The spacer bar 99, itself, is affixed to the end transverse frame member 59 of top gantry box panel 51 by a series of screws. Spacer bar 99 is also adhesively affixed to the peripheral flange of end panel 56. The bottom edge of torsion panel 96 is affixed to the upstanding rib 29 of carriage 18, at the notch 31 thereof, by a series of machine screws 102. The machine screws 102 pass through a washer strip 103 and the bottom edge of torsion panel 96, threadedly engaging rib 29.

Reference is now made to FIGS. 3 and 6. As is clear from FIG. 6, the rear or beam-side end of gantry box 50 is affixed to carriage 19 in exactly the same way. As a consequence, like parts have been given like index numerals follows by "a". The gantry box 50 is attached to carriage 19 by means of a torsion panel 96a having in-turned, vertical edge flanges 97a and 98a. The upper edge of torsion panel 96a is affixed to a spacer bar 99a by machine screws 100a passing through a washer strip 101a and the upper edge of torsion panel 96a, threadedly engaging the spacer bar 99a. The spacer bar 99a is affixed to the gantry box in the manner described with respect to spacer bar 99. At its lower edge, torsion panel 96a is affixed to the upstanding rib 30a of carriage 19, at the position of notch 32a therein, by means of a series of machine screws 102a passing through a washer strip 103a, the lower edge of torsion panel 96a and threadedly engaging the rib 30a.

Reference is now made to FIGS. 7, 4 and 9. Turning first to FIG. 9, it will be noted that the bottom panel of the gantry box 50 is provided with four hard points 73, 74, 75 and 76. These same hard points are shown in broken lines in FIG. 4. As is indicated on FIG. 4, FIG. 7 is a cross-sectional view taken along section line 7—7 of FIG. 4, which section passes through the center of hard point 73. Hard point 73 has a central circular bore formed therethrough, as at 104. The bore 104 receives the main body portion of a housing 105 having a top flange 106 by which it is attached to hard point 73 by a series of machine screws 107. Housing 105 has a blind bore 108 formed therein and extending upwardly from the bottom thereof. The blind bore contains an elastomeric snubber bushing 109. The snubber bushing, in turn, receives a snubber pin 110 having an integral base 111 which is affixed by machine screws 112 to carriage 19. It will be understood that hard point 75 is equivalent to hard point 73 and the housing 105 with its snubber bushing 109 could be mounted in hard point 75, with the snubber pin appropriately mounted on carriage 18. The purpose of the snubber pin and bushing will be apparent hereinafter.

Reference is now made to FIGS. 6, 4 and 9. As indicated in FIG. 4, FIG. 6 is a fragmentary cross-sectional view taken along section line 6—6 of FIG. 4 through the center of hard point 74. The hard point 74 is adapted to receive the body portion 113 of a pin support. The body portion 113 is provided with a flange which is attached to hard point 74 by machine screws 113a. A pin 114, hereinafter referred to as the gantry pin, is affixed to pin support body 113 by a machine screw 115.

A carriage pin 116 is provided with a flange 117 by which it is affixed to carriage 19 by machine screws 118. A link 119 is provided with a pair of bores 120 and 121. The link bore 120 is provided with a bushing 122 and the link bore 121 is provided with a bushing 123. The gantry pin 114 is just nicely received within bushing 120 and the carriage pin 116 is just nicely received within bushing 123. The purpose of the link 119 and pins 114 and 116 will be apparent hereinafter. The hard point 76 of gantry box 50 (see FIGS. 4 and 9) is equivalent to hard point 74. The pin support 113 and gantry pin 114 could be mounted in hard point 76 and the carriage pin 116 could be appropriately mounted on carriage 18 with link 119 joining gantry pin 114 and carriage pin 116.

Figure 22:
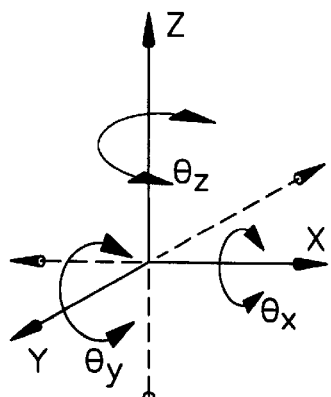
FIG. 22 is a perspective diagram of the various degrees of freedom.

At this point it is important that the movement capabilities of and the constraints upon the gantry assembly 15 be understood. To accomplish this, six possible degrees of freedom, as diagrammatically illustrated in FIG. 22 must be considered. Movement in either direction along the X axis, the Y axis and the Z axis constitute the first three degrees of freedom. Rotation $\theta_x$ about the X axis is the fourth degree of freedom. Rotation $\theta_y$ about the Y axis and rotation $\theta_z$ about the Z axis constitute the fifth and sixth degrees of freedom.

Figure 23:
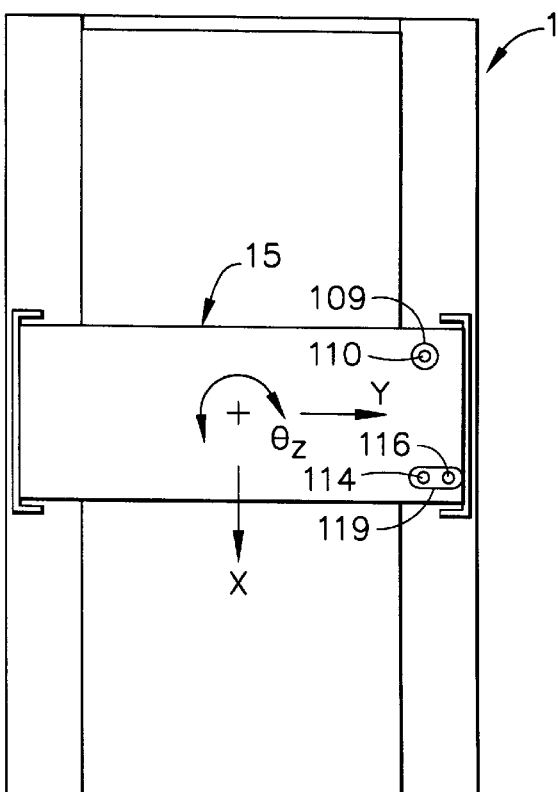
FIGS. 23, 24 and 25 are respectively simplified plan, side elevation and front views of the laser cutting machine indicating the relevant degrees of freedom.
Figure 25:
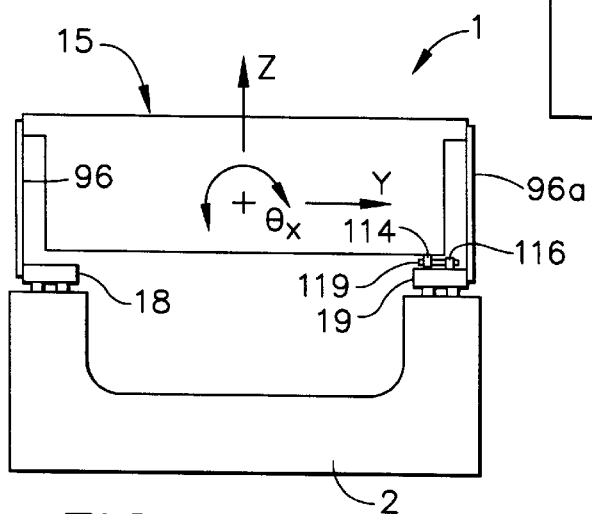
Figure 24:
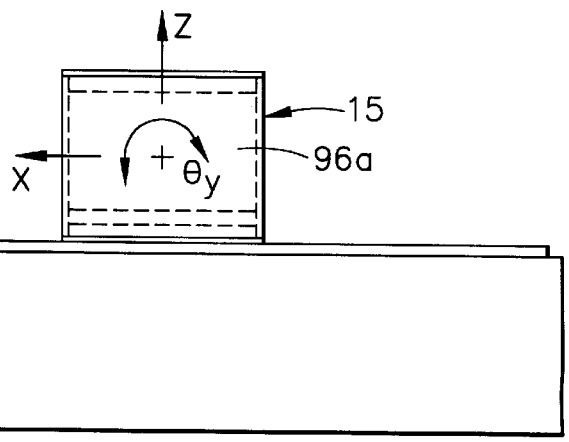

With these degrees of freedom in mind, the primary parts of the gantry assembly 15 will now be considered. Reference is made to the diagrammatic representations of FIGS. 23, 24 and 25.

It will be remembered that the gantry assembly 15 comprises gantry box 50 supported by thin torsion plates 96 and 96a on carriages 18 and 19 respectively. The carriages 18 and 19 are independently driven by linear motors 20 and 21. The carriages 18 and 19 have only one degree of freedom—movement along the X axis. Movement of the carriages 18 and 19 is constrained in the Y direction and the Z direction as well as in the $\theta_x$, $\theta_y$ and $\theta_z$ directions by the sets of preloaded linear bearings 36, 37, 36a and 37a (see FIGS. 5 and 6).

The thin, rectangular, vertical torsion plates 96 and 96a, attaching the gantry box 50 to the linear motor driven carriages 18 and 19, constrain the gantry assembly 15 in the X and Z axes directions relative to the carriages 18 and 19 and prevent rotation relative to carriages 18 and 19 in the $\theta_x$ and $\theta_y$ directions. This is a result of the high stiffness of the torsion plates 96 and 96a with respect to these linear and rotary directions. However, the gantry assembly 15 is not constrained in the Y axis direction and the $\theta_z$ direction by the torsion plates 96 and 96a as a result of the lack of stiffness of the torsion plates 96 and 96a in these directions.

The gantry box 50 is also attached to the beam side carriage (in the Figures this is carriage 19) by connecting link 119, gantry pin 114 and carriage pin 116 (See also FIG. 6). This combination of link and pins constrain gantry box 50 with respect to carriage 19 in the Y direction. As a result, the gantry box 50 is restrained in the X, Y, Z, $\theta_x$ and $\theta_y$ directions relative to carriage 19 and in the X,Z, $\theta_x$ and $\theta_y$ directions relative to carriage 18. Freedom in the $\theta_z$ direction with respect to both carriages 18 and 19 allows the two carriages to be displaced relative to each other to accommodate slight non-synchronous conditions between the two linear motors in normal operation without mechanical binding which would occur if the gantry box 50 was rigidly attached to the carriages 18 and 19. It will be remembered that the gantry assembly is shiftable by linear motors 20 and 21 along the X axis direction, the linear motors being independently controlled by the motion controller and being kept in substantial alignment thereby through the use of the highly accurate closed loop position feedback system utilizing encoders 46 and 46a. It has been found that during normal operation (during cutting or the like), the carriages 18 and 19 may be out of alignment with respect to each other by less than about 0.001 inch. During rapid traverse the carriages may be out of alignment by about 0.006 inch. From the above description, it will be apparent that when carriages 18 and 19 are out of alignment by these very small amounts, the skewed running of the gantry assembly 15 is accommodated by the torsion plates 96 and 96a. The freedom of the gantry box in the $\theta_z$ direction also prevents machine damage during severe non-synchronous conditions as the result of unexpected sudden linear motor shut down or run away.

The snubber pin 110 and snubber bushing 109 also connect gantry box 50 to carriage 19. The function of snubber pin 110 and snubber bushing 109 is to limit rotation of the gantry in the $\theta_z$ directions to a level that will not damage machine components, in particular the torsion plates 96 and 96a. The bushing 109 is constructed from a compliant material. It has a snug fit on the pin 110 and has clearance between its outside diameter and the housing 105 around it. The pin 110 is attached to the carriage 19 and the housing 105 to the gantry box 50. The clearance is sufficient to allow gantry box rotation in the $\theta_z$ directions associated with slight non-synchronous conditions between the two linear motors. However, the clearance is taken up and bushing 109 is compressed when severe non-synchronous motor conditions occur. This begins when the carriage 18 and 19 are out of alignment by about 0.050". The force from the bushing 109 increases with the amount of rotation in the $\theta_z$ directions. It creates a torque that resists the rotation. It is designed so it will prevent machine damage under the most severe non-synchronous condition—specifically when the two linear motors are driving with maximum force in opposite directions.

The gantry box 50 is preferably assembled in an ambient temperature of a value approximately halfway between the highest ambient temperature and the lowest ambient temperature machines of this sort are likely to encounter. The gantry is designed for a ±0.030" expansion or contraction due to ambient air temperature. Z-axis expansion or contraction can be accommodated by vertically adjusting the laser cutting head 14. X axis expansion or contraction can be accommodated by properly locating the gantry assembly along the X axis. Y axis expansion or contraction is accommodated by freedom of the gantry box 50 relative to the operator side carriage 18 in the Y directions.

The linear motor driven laser cutting machine 1 of the present invention is illustrated throughout the drawings such that if one were to stand at the end of main frame 2 adjacent loading and unloading zone 10, the operator's console 27 would be to the left, and the X-axis laser beam delivery bellows would be to the right. This set-up of machine 1 is known in the art as "a right hand machine". In some instances, space requirements or other factors make it desirable to interchange the positions of control console 27 and X-axis laser beam delivery bellows 22a. Such a machine is commonly known in the art as a "left hand" machine. It will be remembered that the carriages 18 and 19 are identical and completely interchangeable. It will further be remembered from FIGS. 4 and 9 that hard point 75 is the equivalent of hard point 73 and hard point 76 is the equivalent of hard point 74 so that the snubber pin 110 could be attached to carriage 18 and the snubber bushing housing 105 could be attached to hard point 75. Similarly, the gantry pin 114 could be attached to hard point 76 and the carriage pin 116 to carriage 18 with link 119 accommodating both. It is preferred that the link and pin assembly and the snubber pin and snubber bushing assembly be located on the beam side of the machine (whether it be a right hand or a left hand machine), because these elements tend to keep the optical path of the beam in the desired alignment.

Figure 2:
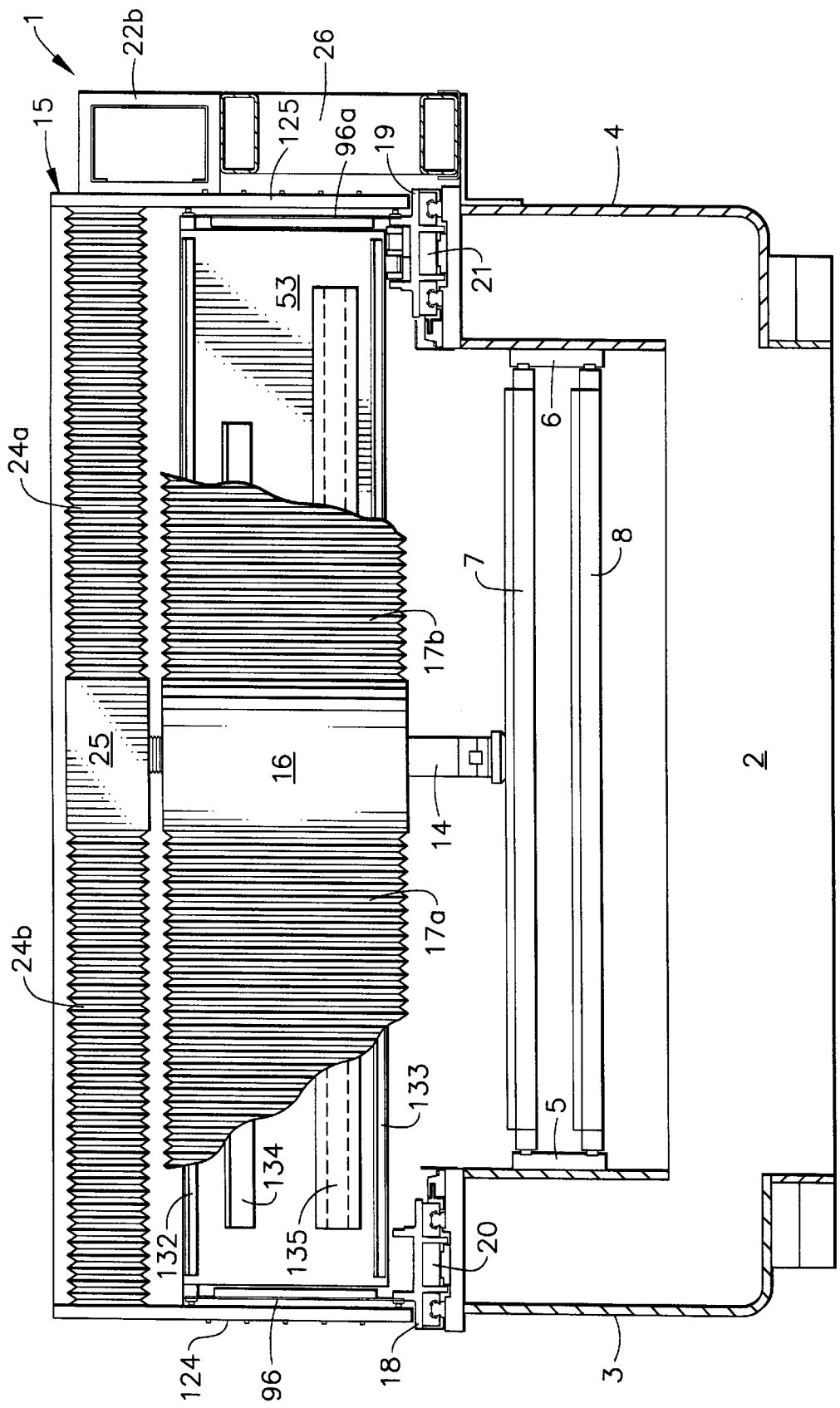
FIG. 2 is a simplified cross-sectional view taken along section line 2—2 of FIG. 1.

As is clearly shown in FIGS. 1 and 2, the ends of gantry 15 are provided with protective panels 124 and 125. The panels 124 and 125 are substantially identical and are made of a honeycomb construction similar to that described with respect to FIGS. 8, 9 and 10.

Reference is now made to FIGS. 4, 6 and 14. FIG. 4 shows both protective panels 124 and 125. In FIG. 6, protective panel 125 is fragmentarily illustrated. In FIG. 14, protective panel 125 is shown in phantom lines. As is most clearly shown in FIGS. 4 and 14, the rear or beam-side end of gantry box 50 has along its vertical edges a pair of aluminum spacer bars 126 and 127 which are glued to the exterior surface of the flange portion 93 of end panel 55. The protective panel 125 is attached to gantry box 50 by means of self-tapping screws 128 which pass through the panel 125, through the spacer bars 126 and 127, through the flange portion 93 of end panel 55 and into the adjacent vertical frame elements of the first and second side panels 53 and 54. It will be understood that the front or operator's-side protective panel 124 is mounted to the adjacent end panel 56 in exactly the same manner, utilizing vertical spacer bars 129 and 130 (see FIGS. 4 and 5), which are identical to spacer bars 126 and 127. The attachment is made by way of self-tapping screws 131, identical to the screws 128 of FIG. 7.

Reference is now made to FIGS. 3 and 14. As is shown in these Figures, the first side panel 53 of gantry box 50 supports a pair of Y-axis bearing rails 132 and 133. The laser cutting head carriage 16 is mounted on rails 132 and 133. First side panel 53 also supports a Y-axis encoder 134a mounted on bar 134. The read head portion of encoder 134a is associated with carriage 16 and is not shown in either of these Figures. Finally, first side panel 53 supports a magnet track 135 constituting a part of the linear motor (not shown) located within carriage 16.

Figure 15:
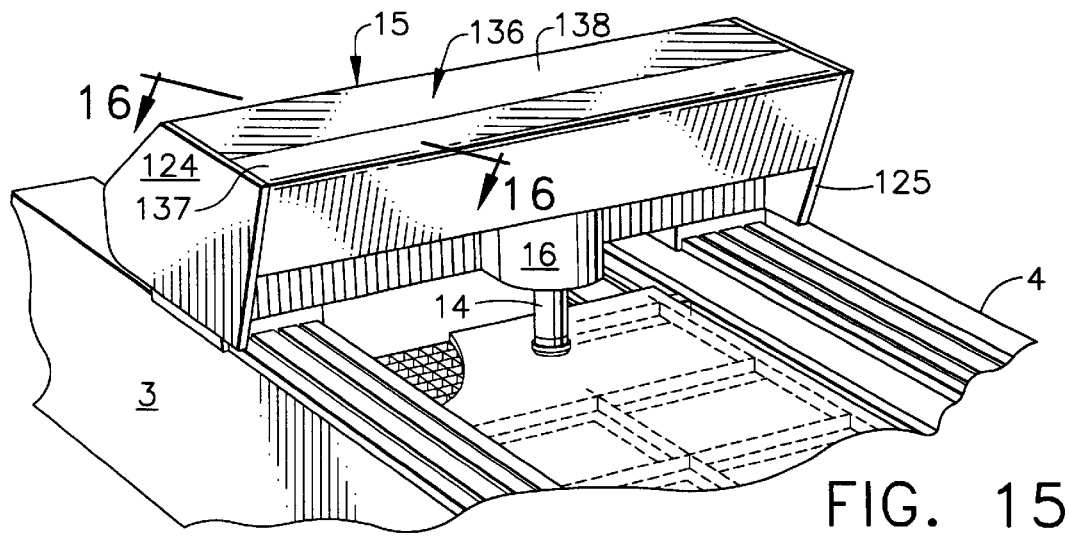
FIG. 15 is a fragmentary perspective view illustrating the two-part cover for the gantry assembly of the present invention.
Figure 16:
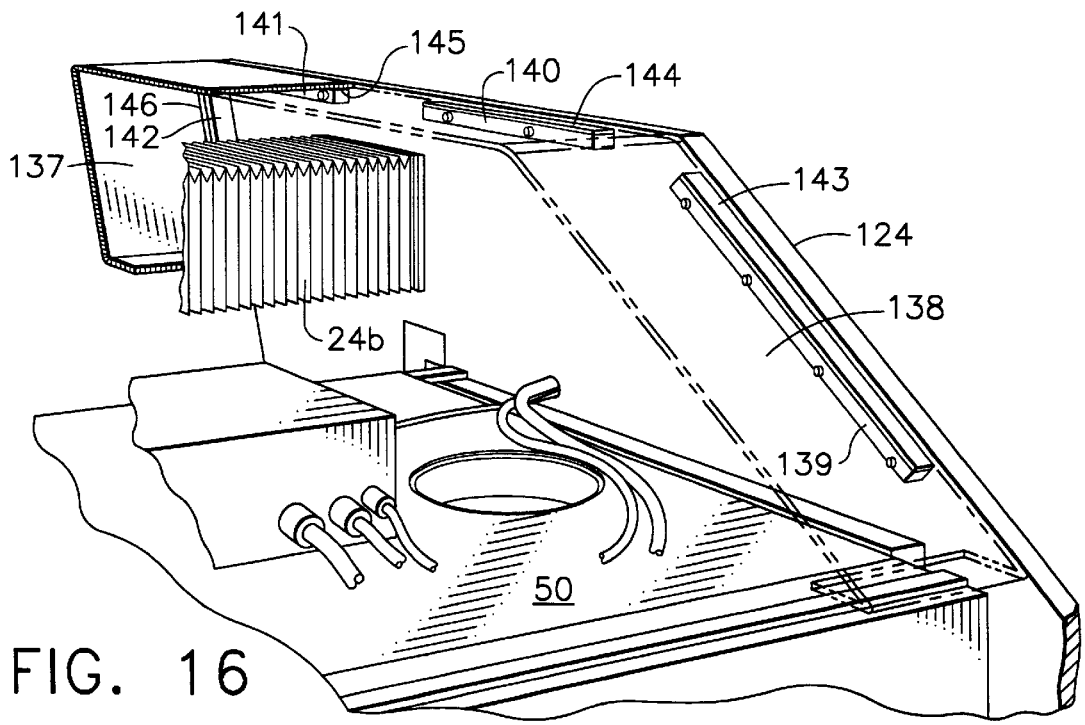
FIG. 16 is a fragmentary perspective view illustrating the manner in which the gantry cover parts are supported on the gantry assembly.
Figure 17:
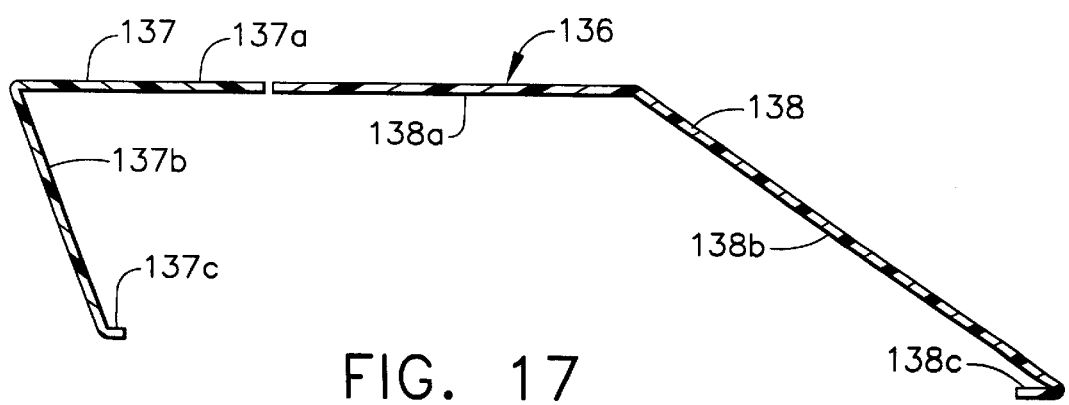
FIG. 17 is a simplified end view of the gantry assembly two-part cover.

Reference is now made to FIGS. 15, 16 and 17. It is preferred to provide the gantry assembly 15 with a lightweight cover generally indicated at 136. The gantry cover assembly 136 is made up of first and second parts 137 and 138. The cover serves a number of purposes. First of all, it protects the gantry assembly from dust and the like. It also serves as an additional guard for the Y-axis beam. It further protects various elements mounted on the gantry box 50 such as cables, etc. Finally, it improves the appearance of gantry assembly 15.

The two piece cover may be made of any appropriate, strong, lightweight material. Excellent results have been achieved when the first and second cover parts were made of fiberglass.

The first cover part 137 comprises a horizontal portion 137a, a downwardly and rearwardly extending front portion 137b and a short, in-turned lower portion 137c. The second part 138 of cover 136 comprises a horizontal portion 138a, a downwardly and rearwardly sloping rear portion 138b, and a forwardly extending, in-turned bottom portion 138c.

As is clearly shown in FIG. 15, the cover parts 137 and 138 are of a length to span the distance between protective panels 124 and 125. As is shown in FIG. 16, protective panel 124 is provided with a series of aluminum bars 139, 140, 141 and 142 which are both adhesively adhered to and screwed to the inside surface of protective panel 124. Each of the bars 139 through 142 is inset from the adjacent edge of protective panel 124 and supports a strip of conventional hook and loop tape material indicated at 143 through 146. It will be understood that protective panel 125 will similarly be provided with bars identical to bars 139 through 142 bearing segments of hook and loop fastener tape identical to segments 143 through 146.

The first cover part 137 will be provided with appropriate hook and loop tape segments (not shown) along both interior end edges of portions 137a and 137b by which the first cover part 137 may be affixed to protective panels 124 and 125. In a similar fashion, the inside end edges of portions 138a and 138b of cover part 138 will be provided with corresponding hook and loop tape strips by which the second cover part 138 may be affixed to protective panels 124 and 125. In this manner, the cover parts 137 and 138 can be easily mounted on and removed from protective panels 124 and 125. It will be noted that the inturned lower portion 138c of second panel part 138 is located adjacent the top of gantry box 50. Furthermore, portion 137a of cover part 137 is coplanar with portion 138a of cover part 138 and in abutment therewith when both cover parts 137 and 138 are mounted on protective panels 124 and 125.

Figure 18:
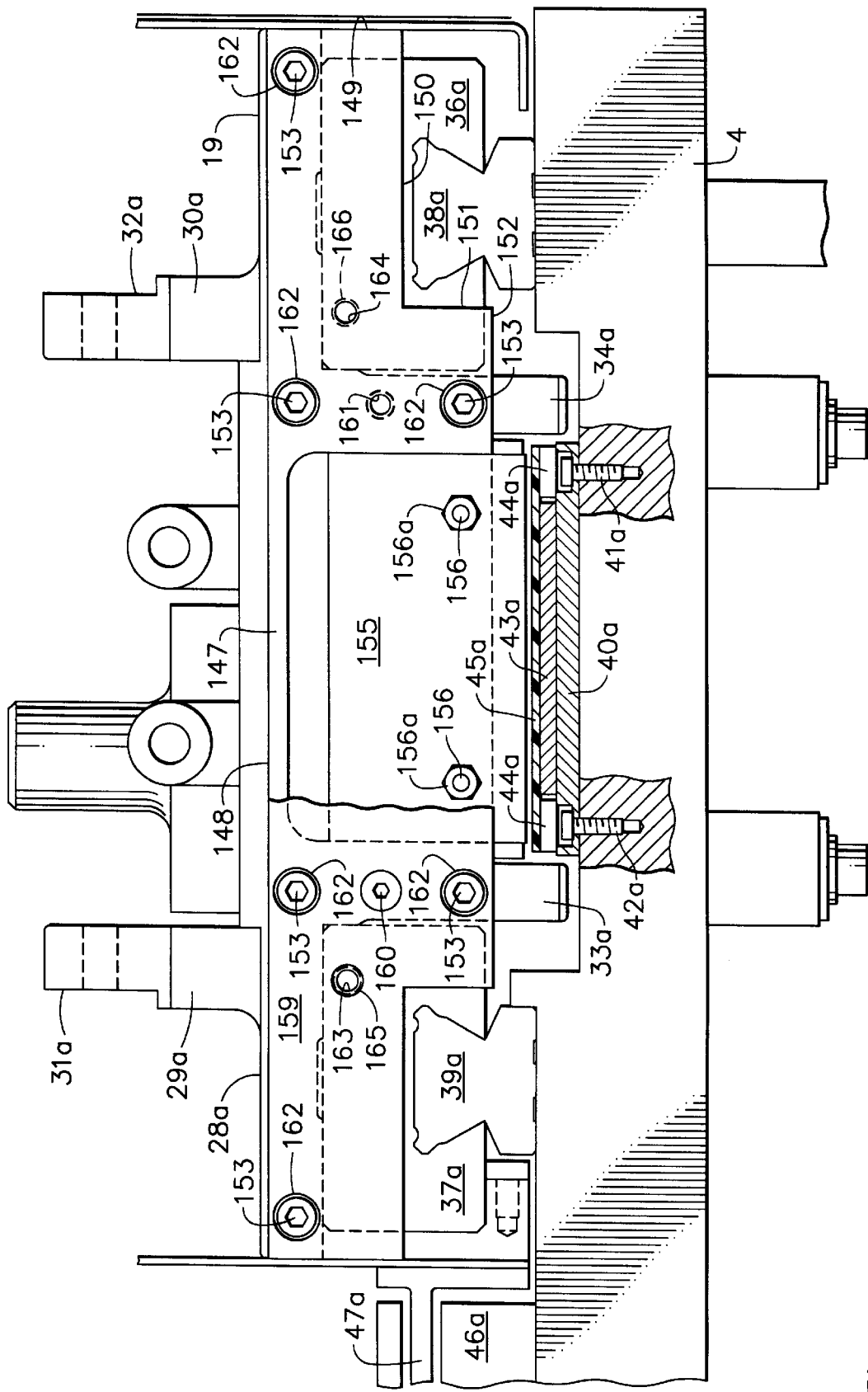
FIG. 18 is a fragmentary elevational view illustrating one of the linear motor wiper/seal assemblies of the present invention.

As shown in FIGS. 5, 6 and 7, linear motors 20 and 21 are located approximately 0.015 inch above their respective protective layers 45 and 45a covering their respective magnet tracks 42 and 42a. To prevent damage to magnet tracks 42 and 42a and linear motors 35 and 35a, and possible jamming thereof, it is important that the space between the linear motors and their respective magnet tracks be kept free of metallic particulate material and other debris. For this purpose, both ends of carriages 18 and 19 are provided with wiper/seal assemblies which ride along and in contact with protective layers 45 and 45a. The wiper/seal assemblies for the ends of carriages 18 and 19 are identical. Therefore, a description of one may serve as a description of all. FIG. 18 illustrates that end of carriage 19 which faces loading and unloading zone 10. The wiper/seal assembly comprises a seal mounting plate 147 having an upper edge 148 which extends the full width of the end of carriage 19. The upper edge 148 of mounting plate 147 terminates on the right side of FIG. 18 in a vertical end edge 149. The lower end of edge 149 terminates in a horizontal edge 150 which extends across bearing rail 38a with clearance. The edge 150 terminates in a downwardly extending edge 151 to the left of bearing rail 38a (as viewed in FIG. 18). The edge 151 terminates on the bottommost edge 152 of the mounting plate 147 which extends across the lower portion of the end of linear motor 21. The left hand end portion of mounting plate 147, as viewed in FIG. 18, is obscured by a fragmentarily shown cover plate to be described hereinafter. The left end portion of mounting plate 147 is a mirror image of the right end portion just described and is provided with a vertical edge portion equivalent to vertical edge 151, a horizontal edge portion equivalent to horizontal edge 150 and spaced above bearing rail 39a, and a vertical end edge equivalent to vertical end edge 149.

The seal mounting plate 137 is affixed to the end of carriage 19 by a series of countersunk machine screws 153. Four of the machine screws are threadedly engaged in the horizontal body portion 28a of carriage 19. Two of the machine screws 153 are threadedly engaged in the downwardly depending ribs 33a and 34a of carriage 19.

The central portion of seal mounting plate 147, between the downwardly depending ribs 33a and 35a of carriage 19, is provided with an inverted U-shaped depression 54. Slidably mounted within depression 154 is a wiper/seal plate 155. The wiper/seal plate 155 has a pair of machine screws 156 mounted therethrough and provided with nuts 156a. The machine screws 156 and their nuts are attracted to magnets 43a of magnet track 40a to bias the wiper/seal plate 155 against protective layer 45a. The machine screws 156 are flat head machine screws, the heads of which do not extend beyond the adjacent surface of wiper/seal plate 155.

The wiper/seal assembly is completed by a cover member 159 which is fragmentarily shown in FIG. 18. The cover member 159 has the same peripheral configuration as the seal mounting plate and, as is evident from FIG. 18, covers most of the wiper/seal plate 155, confining plate 155 within depression 154. The cover plate 159 has two slots (not shown) formed therein to accommodate nuts 156a. The cover plate 159 is affixed to the seal mounting plate by a pair of countersunk, flat head, machine screws 160 and 161. It will be noted that machine screw 160 is not threadedly engaged in the downwardly depending rib 33a of carriage 19, and the machine screw 161 is not threadedly engaged in the downwardly depending rib 34a of carriage 19. It will be noted that the cover member 159 is provided with a number of holes 162 which completely expose the heads of bolts 153. This allows the bolts 153 to be removed so that the entire wiper/seal assembly can be removed from carriage 19 as a unit. Finally, it will be noted that the seal mounting plate 147 has formed therein a pair of threaded holes 163 and 164. The cover member 159 has a pair of corresponding holes 165 and 166 which expose the threaded holes 163 and 164 in the seal mounting plate 147. The purpose of the threaded holes 163 and 164 and the cover member holes 165 and 166 will be apparent hereinafter.

For purposes of clarity, the lower edge of wiper/seal plate 155 is shown slightly elevated above protective cover 45a of the magnet track 42a. It will be understood that, under normal circumstances, the wiper/seal plate 155 will be biased against protective cover 45a by the magnetic attraction of machine screws 156 by magnets 43a. Since there is a wiper/seal assembly at both ends of both carriages 18 and 19, it will be understood that each of the magnet tracks 42 and 42a will be constantly wiped by two wiper/seal plates during traverse of the gantry assembly 15 in the directions of the X-axis. This will not only tend to keep the top surface of the protective layers 45 and 45aclean, but will actually form a seal (there being a wiper/seal plate at either end of each carriage) for those areas of each magnet track 42 and 42awhich the linear motors 35 and 35a overlie at any given time. The wiper/seal plate 155 should be made of a material which is highly resistant to wear.

Figure 19:
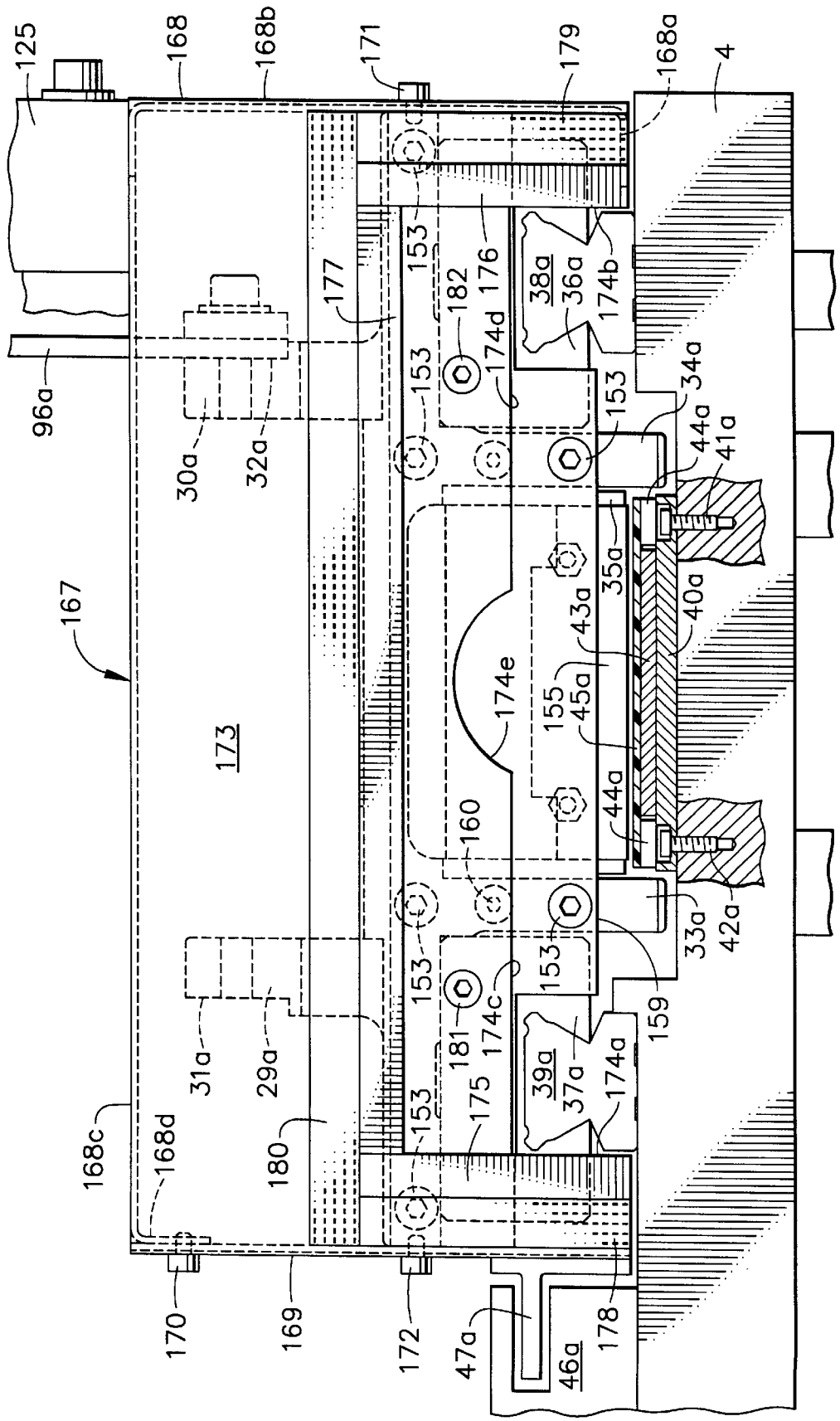
FIG. 19 is a fragmentary elevational view, similar to FIG. 18, and illustrating the bellows mounting plate affixed to the structure of FIG. 18.

Reference is now made to FIG. 19. FIG. 19 is similar to FIG. 18 and illustrates the same end of carriage 19. As is shown in FIG. 19, the carriage 19 is provided with a protective cover, generally indicated at 167. The cover 167 comprises a first part 168 which is of a length substantially equal to the length of carriage 19. The cover part 168 comprises a lower in-turned flange 168a, a vertical side wall 168b, a horizontal top 168c and a down turned narrow flange 168d. The carriage cover 167 has a second part 169 which comprises a vertical wall to which the flange 168d is attached by screws, one of which is shown at 170. Part 169 also is of a length substantially equal to the length of carriage 19. It will be noted that the vertical wall portions 168b and 169 of carriage cover 167 are attached to the longitudinal edges of the main body portion 28a of carriage 19 by machine screws, shown at 171 and 172. It will be noted that the vertical walls 168b and 169 extend from a point just above the top surface of the rear or beam-side main frame portion 4 to an upper position defined by the carriage cover top 168c which extends transversely of the carriage just beneath the bottom edge of protective panel 125 and just beneath the gantry box 50 (not shown). It will be understood that the carriage cover top 168c will have an opening formed therein to accommodate torsion panel 96a, the snubber bushing 109 and snubber pin 110 and the gantry pin 114, carriage pin 116 and link 119 (not shown). It will be understood that the carriage cover for carriage 18 will be substantially identical and will constitute a mirror image of carriage cover 167. The ends of carriage cover 167 are provided with bellows mounting plates, one of which is shown at 173 in FIG. 19. It will be understood that the bellows plate at the other end of carriage 19 and the bellows plates for carriage 18 will be identical so that a description of bellows mounting plate 173 can stand as a description of all of the bellows mounting plates.

Bellows mounting plate 173 is a rectangular member having the same external dimensions as carriage cover 167. The bellows mounting plate has a notch formed therein extending upwardly from its bottom edge. The notch is generally indicated 174 and comprises vertical end edges 174a and 174b terminating in horizontal edge portions 174c and 174d, the ends of which meet in an arcuate edge portion 174e. The bellows mounting plate 173 is provided with a pair of upstanding foam strips 175 and 176, joined by a horizontal foam strip 177. Adjacent the outside edges of foam strips 175, 176 and 177 there are located strips of hook and loop type fastener tape 178, 179 and 180.

The bellows mounting plate is mounted to the cover member 159 (see FIG. 18) by flat head screws 181 and 182 which pass through the bellows mounting plate, the holes 165 and 166 in cover plate 159 and threadedly engaged in the threaded holes 163 and 164 of seal mounting plate 147. As is clear from FIG. 20, when so mounted the bellows mounting plate 173 is located slightly above the top surface of rear or beam-side main frame portion 4 and is in abutment with the end edges of carriage cover 167.

In FIG. 20, a conventional bellows is generally indicated at 183 and is shown in cross-section. The bellows is made up of a series of bellows frames, two of which are shown at 184 and 185 with the usual flexible foldable material therebetween indicated at 186. That bellows frame 184 adjacent bellows mounting plate 173 has an inverted U-shaped arrangement of hook and loop type tape 187 corresponding to the hook and loop type tape elements 178, 179 and 180 of the bellows mounting plate 173. As a consequence, when the bellows frame member 184 is pressed against the bellows mounting plate 173, there will be a firm attachment therebetween by virtue of the corresponding hook and loop tape elements. In addition, the bellows frame 184 is held pressed against the foam elements 175, 176 and 177 of the bellows mounting plate forming a seal. Such a seal is of importance. Since the linear motors are capable of moving the gantry assembly 15 at high speed, as the bellows expand, they tend to suck in foreign material, a momentary vacuum being created during a rapid traverse.

Modifications may be made in the invention without departing from the spirit of it.

What is claimed:

1. A laser cutting machine of the type having a main frame with longitudinally extending front-side and rear-side upstanding main frame portions in parallel spaced relationship and having horizontal, coplanar top surfaces, a cutting zone and a loading and unloading zone located between said upstanding main frame portions, upper and lower workpiece supporting pallets being shiftable between said cutting and said loading and unloading zones, said laser cutting machine having a longitudinal X axis, a transverse Y axis, and a vertical Z axis, said upper surfaces of said upstanding main frame portions each having a pair of longitudinally extending bearing rails thereon, a first front-side gantry carriage and a second rear-side gantry carriage being mounted on and shiftable longitudinally along said pair of bearing rails on said front-side upstanding main frame portion and said pair of bearing rails on said rear-side upstanding main frame portion, each of first and second gantry carriages having its own linear motor associated therewith and being independently driven thereby in the directions of said X axis, a gantry extending transversely of said main frame, said gantry having ends each attached to and supported on the adjacent one of said first and second gantry carriages by a torsion plate, a carriage mounted laser head, said gantry having a pair of bearing rails, said laser head and carriage therefor being mounted on and shiftable along said gantry bearing rails transversely of the main frame and a linear motor associated with said laser head carriage to move said laser head carriage in the directions of said Y axis, said laser head being shiftable vertically with respect to said laser head carriage in the directions of said Z axis, a high performance multi-axis motion controller capable of interfacing with said linear motors of said gantry carriages and said laser head carriage, and a linear encoder associated with each of said linear motors providing position feedback for said motion controller.

2. The structure claimed in claim 1 including horizontal spacer members attached to said gantry ends near the tops thereof, each of said gantry carriages having an upstanding longitudinal rib, said torsion plates being substantially rectangular with top, side and bottom edges, each of said torsion plates being affixed near its top edge to its respective one of said horizontal gantry spacer members, each of said torsion plates being affixed near its bottom edge to said longitudinal rib of its respective gantry carriage.

3. The structure claimed in claim 2 wherein each of said torsion panels has flanges formed on its side edges directed toward the adjacent gantry end.

4. The structure claimed in claim 3 wherein said torsion panels are made of ⅛" aluminum.

5. The structure claimed in claim 1 wherein each gantry carriage has a pair of downwardly directed, longitudinally extending ribs in parallel spaced relationship, each gantry carriage having its linear motor mounted between its downwardly directed ribs, each gantry carriage having sets of preloaded bearings along each of its downwardly directed ribs positioned to cooperate with its respective pair of bearing rails mounted on the top surface of its respective one of said upstanding main frame portions, a magnet rail mounted on the top surface of each upstanding main frame portion between the bearing rails thereon, each magnet rail constituting a part of said linear motor of its respective gantry carriage, each magnet rail comprising a base substantially as long as said adjacent bearing rails, a plurality of magnets being adhesively affixed to said base extending transversely thereof, a protective layer being mounted over said magnets and comprising a barrier to dirt, foreign material and moisture.

6. The structure claimed in claim 5 including a wiper-seal assembly at each end of each of said first and second gantry carriages to maintain the space between each linear motor and its magnet track free of metallic particulate material and other debris.

7. The structure claimed in claim 5 including a wiper-seal assembly at each end of each of said first and second gantry carriages to maintain the space between each linear motor and its magnet track free of metallic particulate material and other debris, each wiper-seal assembly comprising a seal mounting plate affixed by machine screws to its respective end of its respective gantry carriage, said mounting plate being appropriately shaped to clear said bearing rails upon which its respective gantry carriage rides and having a lower edge portion spaced upwardly from said magnet rail of its respective gantry carriage, said mounting plate having an inverted U-shaped depression formed therein above its respective magnet rail, a non-magnetic wiper-seal plate being located in said depression and being vertically slidable therein, a pair of machine screws being affixed to said wiper-seal plate such that attraction of said machine screws by said magnets of the adjacent magnet track urges said wiper-seal plate into contact with said protective layer of said adjacent magnet track, and a cover plate having substantially the same peripheral shape as said mounting plate and covering said depression in said mounting plate to retain said wiper-seal plate therein, said cover plate being affixed to said mounting plate by machine screws, said cover plate having perforations therein providing access to said machine screws affixing said mounting plate to said carriage, such that said wiper-seal assembly, including said mounting plate, said wiper-seal plate and said cover plate, can be removed from their respective gantry carriage end as a unit.

8. The structure claimed in claim 7 including a bellows mounting plate for each end of each gantry carriage, each bellows mounting plate being substantially rectangular and having top, bottom and side edges and front and rear surfaces, said bellows mounting plate having a notch formed therein and extending upwardly from its bottom edge, said notch being sized to accommodate its respective bearing rails and magnet rail, said bellows plate being located with its rear surface abutting said cover plate of its respective wiper-seal assembly and being affixed thereto by machine screws passing through said cover plate and threadedly engaged in the adjacent seal mounting plate, a vertically oriented pair of foam strips being affixed to said front surface of said bellows mounting plate near each end of said notch, said vertical foam strips being joined by a horizontal foam strip affixed to said bellows mounting plate front surface above said notch therein, said foam strips having outer edges flanked by corresponding strips of hook and loop type tape affixed to the front surface of said bellows mounting plate, a bellows of U-shaped cross-section being provided at each end of each gantry carriage and covering said bearing rails and magnet track of its respective carriage, each bellows having an endmost bellows frame configured to abut said foam strips of its respective bellows mounting plate and being provided with strips of hook and loop type tape adopted to cooperate with the hook and loop tape strips of its respective bellows mounting plate to be releasable attached thereto.

9. The structure claimed in claim 8 including a cover for each gantry carriage, each cover comprising sides affixed to carriage and a top, each cover having a length substantially equal to the length of its respective gantry carriage, said cover top having an opening thereon to accommodate said torsion plate of its respective carriage and said snubber pin, said snubber pin housing, said gantry pin, said carriage pin and said link if mounted on its respective gantry carriage, said adjacent bellows mounting plates closing the open ends of said covers.

10. The structure claimed in claim 1 wherein said gantry has a bottom, a front side, a rear side, a front-side end, a rear-side end and a top, said front side mounting said laser head carriage and bearing rails therefor, a housing mounted on said gantry bottom adjacent a corner thereof formed between said rear side and said rear-side end, said housing having a vertical blind bore formed therein, an elastomeric snubber bushing mounted in said blind bore, a snubber pin mounted on said rear-side carriage and extending into said snubber bushing, a downwardly depending pin mounted on said gantry bottom near a corner thereof formed between said rear-side gantry end and said gantry front side, an upstanding pin mounted on said rear-side gantry carriage, a link having two bores formed therein, one receiving said gantry pin and the other receiving said carriage pin.

11. The structure claimed in claim 1 including 6 possible degrees of freedom comprising motion in the directions of said X axis, motion in the directions of said Y axis, motion in the directions of said Z axis, rotation $\theta_x$ about said X axis, rotation $\theta_y$ about said Y axis and rotation $\theta_z$ about said Z axis, said gantry carriages being restrained with respect to all said degrees of freedom except along said X axis directions, said gantry being restrained relative to said second rear-side carriage in all of said degrees of freedom except in said $\theta_z$ directions and said gantry being restrained relative to said first front-side carriage in all of said degrees of freedom except in said Y directions and said $\theta_z$ directions, said gantry being limited in said $\theta_z$ directions with respect to said second carriage by said snubber pin and snubber bushing, said gantry being shiftable with respect to said main frame in the directions of said X axis by said gantry carriage linear motors.

12. The structure claimed in claim 1 wherein said gantry is of honeycomb construction characterized by high strength, light weight, high vibration absorption and a high stiffness to weight ratio.

13. The structure claimed in claim 6 wherein said gantry comprises top, bottom and side panels, each of said top, bottom and side panels comprises a peripheral frame of aluminum tubing of rectangular cross-section, a thin aluminum skin covering both sides of said frame, an aluminum honeycomb structure located within said frame and between said skins, said skins being adhesively attached to said frame and said honeycomb structure, said top, bottom and side panels having longitudinal and end edges, the longitudinal edges of said side panels being affixed to the longitudinal edges of said top and bottom panels to form an elongated, open-ended structure, each of said end panels comprising a rectangular, aluminum honeycomb structure sized to be just nicely received within its respective open end of said open ended structure, one side of said rectangular honeycomb structure having adhesively adhered thereto a first thin aluminum skin of the same peripheral shape as said honeycomb structure, the other side of said rectangular honeycomb structure having adhesively adhered thereto a second thin aluminum skin of larger peripheral dimension so as to form a peripheral flange of said skin thereabouts, each such end panel being adhesively attached to its respective end of said open-ended structure with said honeycomb structure and said first skin being received between the adjacent end edges of said top, bottom and side panels and the peripheral flange portion of said second skin adhesively adhered to said end edges of said top, bottom and side panels.

14. The structure claimed in claim 13 wherein said frame of aluminum tubing for each of said top, bottom and side panels comprises a pair of longitudinal frame members joined at their ends by transverse end frame members and including at least one additional transverse frame member located between said transverse end frame members.

15. The structure claimed in claim 14 wherein hard points are located in selected ones of said panels between said skins thereof enabling elements to be attached to said selected panels.

16. The structure claimed in claim 15 wherein said side panels comprise front and rear side panels, said front side panel being provided with appropriate hard points to mount said bearing rails for said laser head carriage, a housing mounted on a hard point in said gantry bottom panel adjacent a corner thereof formed between said rear side panel and said rear-side end panel, said housing having a vertical blind bore formed therein, an elastomeric snubber bushing mounted in said blind bore, a snubber pin mounted on said rear-side carriage and extending into said snubber bushing, a downwardly depending pin mounted on a hard point in said gantry bottom panel near a corner thereof formed between said rear-side gantry end panel and said gantry front side panel, an upstanding pin mounted on said rear-side gantry carriage, a link having two bores formed therein, one receiving said gantry pin and the other receiving said carriage pin.

17. The structure claimed in claim 16 including six possible degrees of freedom comprising motion in the directions of said X axis, motion in the directions of said Y axis, motion in the directions of said Z axis, rotation $\theta_x$ about said X axis, rotation $\theta_y$ about said Y axis and rotation $\theta_z$ about said Z axis, said gantry carriages being restrained with respect to all of said degrees of freedom except motion along said X axis by said sets of preloaded linear bearings, said gantry, with respect to said first and second gantry carriages, is restrained in the directions of said X and Z axes and rotation $\theta_x$ and rotation $\theta_y$ by said torsion plates, said gantry being unrestrained in the Y axis directions and the $\theta_z$ directions with respect to said first gantry carriage, said gantry being restrained in said Y directions with respect to said second gantry carriage by virtue of said link and said gantry and second carriage pins, said gantry being unrestrained in said $\theta_z$ directions with respect to either gantry carriage, said gantry being limited in said $\theta_z$ directions with respect to said second carriage by said snubber pin and said snubber bushing.

18. The structure claimed in claim 1 including vertical protective end panels of honeycomb construction mounted by spacer means to said ends of said gantry exteriorly of said torsion plates, a light weight cover for said gantry being removably mounted on said protective end panels.

19. The structure claimed in claim 18 wherein said cover is made of fiberglass.

20. The structure claimed in claim 19 wherein said cover comprises a forward portion and a rearward portion, said portions having corresponding abutting edges.

21. A laser cutting machine of the type having a main frame with longitudinally extending, front-side and rear-side upstanding main frame portions in parallel spaced relationship and having horizontal, coplanar top surfaces, a cutting zone and a loading and unloading zone located between said upstanding main frame portions, upper and lower workpiece supporting pallets being shiftable between said cutting and said loading and unloading zones, said laser cutting machine having a longitudinal X axis, a transverse Y axis, and a vertical Z axis, said upper surfaces of said upstanding main frame portions each having a pair of longitudinally extending bearing rails thereon, a first front-side gantry carriage and a second rear-side gantry carriage being mounted on and shiftable longitudinally along said pair of bearing rails on said front-side upstanding main frame portion and said pair of bearing rails on said rear-side upstanding main frame portion, said first and second gantry carriages being driven in the directions of said X axis, a gantry extending transversely of said main frame, said gantry comprising an elongated assembly of honey comb construction, said gantry having ends each attached to and supported on the adjacent one of said first and second gantry carriages, a carriage mounted laser head, said gantry having a pair of bearing rails, said laser head and carriage therefor being mounted on and shiftable along said gantry bearing rails transversely of the main frame in the directions of said Y axis, said laser head being shiftable vertically with respect to said laser head carriage in the directions of said Z axis.

22. The structure claimed in claim 21 wherein said gantry comprises top, bottom and side panels, each of said top, bottom and side panels comprises a peripheral frame of aluminum tubing of rectangular cross-section, a thin aluminum skin covering both sides of said frame, an aluminum honeycomb structure located within said frame and between said skins, said skins being adhesively attached to said frame and said honeycomb structure, said top, bottom and side panels having longitudinal and end edges, the longitudinal edges of said side panels being affixed to the longitudinal edges of said top and bottom panels to form an elongated, open-ended structure, each of said end panels comprising a rectangular, aluminum honeycomb structure sized to be just nicely received within its respective open end of said open ended structure, one side of said rectangular honeycomb structure having adhesively adhered thereto a first thin aluminum skin of the same peripheral shape as said honeycomb structure, the other side of said rectangular honeycomb structure having adhesively adhered thereto a second thin aluminum skin of larger peripheral dimension so as to form a peripheral flange of said skin thereabouts, each such end panel being adhesively attached to its respective end of said open-ended structure with said honeycomb structure and said first skin being received between the adjacent end edges of said top, bottom and side panels and the peripheral flange portion of said second skin adhesively adhered to said end edges of said top, bottom and side panels.

23. The structure claimed in claim 22 wherein said frame of aluminum tubing for each of said top, bottom and side panels comprises a pair of longitudinal frame members joined at their ends by transverse end frame members and including at least one additional transverse frame member located between said transverse end frame members.

24. The structure claimed in claim 23 wherein hard points are located in selected ones of said panels between said skins thereof enabling elements to be attached to said selected panels.

25. A structural panel characterized by high strength, light weight, vibration absorption and a high stiffness to weight ratio, said panel comprising a peripheral frame of aluminum tubing of rectangular cross-section, a honey comb layer surrounded by and adhesively adhered to said frame and being of the same thickness as said frame, and a thin skin glued to either side of said frame and to said honey comb layer.

26. The structure claimed in claim 25 wherein said frame of aluminum tubing comprises a pair of longitudinal frame members joined at their ends by transverse end frame members and including at least one additional transverse frame member located between said transverse end frame members.

27. The structure claimed in claim 26 wherein hard points are located in said panel between said skins thereof enabling elements to be attached to said panels.

\* \* \* \* \*

UNITED STATES PATENT AND TRADEMARK OFFICE
CERTIFICATE OF CORRECTION

PATENT NO. : 5,854,460
DATED : December 29, 1998
INVENTOR(S) : Raymond J. Graf, et al It is certified that error appears in the above-indentified patent and that said Letters Patent is hereby corrected as shown below:

Column 15, line 54, (claim 8) please delete "releasable" and insert --releasably--

Column 16, line 35, (claim 13) claim "6" should read claim --12--

Column 16, line 55 (claim 13) please delete "thereabouts" and insert --thereabout--

Column 18, line 33, (claim 22) please delete "thereabouts" and insert --thereabout--

Signed and Sealed this

Fifteenth Day of June, 1999

*Attest:*

Q. TODD DICKINSON

*Attesting Officer*   Acting Commissioner of Patents and Trademarks